(12) United States Patent
Nakamura

(10) Patent No.: US 7,729,062 B2
(45) Date of Patent: Jun. 1, 2010

(54) IMAGING LENS AND IMAGING DEVICE INCLUDING THE IMAGING LENS

(75) Inventor: Masato Nakamura, Kawaguchi (JP)

(73) Assignee: Enplas Corporation, Saitama (JP)

( * ) Notice: Subject to any disclaimer, the term of this patent is extended or adjusted under 35 U.S.C. 154(b) by 134 days.

(21) Appl. No.: 11/986,053

(22) Filed: Nov. 20, 2007

(65) Prior Publication Data

US 2008/0278827 A1   Nov. 13, 2008

(30) Foreign Application Priority Data

Nov. 21, 2006   (JP)   .............................. 2006-314528

(51) Int. Cl.
*G02B 9/06*   (2006.01)

(52) U.S. Cl. ..................................... 359/794
(58) Field of Classification Search ................. 359/793, 359/794, 691
See application file for complete search history.

(56) References Cited

U.S. PATENT DOCUMENTS

| | | | |
|---|---|---|---|
| 6,992,841 B2 * | 1/2006 | Saito et al. ................... | 359/794 |
| 7,457,054 B2 * | 11/2008 | Saito ........................... | 359/794 |
| 2007/0121221 A1 * | 5/2007 | Kim ............................ | 359/794 |

FOREIGN PATENT DOCUMENTS

| | | |
|---|---|---|
| JP | H5-281465 | 10/1993 |
| JP | 2000-35533 | 2/2000 |
| JP | 2000-227547 | 8/2000 |
| JP | 2000-266997 | 9/2000 |
| JP | 2001-174701 | 6/2001 |
| JP | 2002-23050 | 1/2002 |
| JP | 2003-215446 | 7/2003 |
| JP | 2003-232990 | 8/2003 |
| JP | 2003-232991 | 8/2003 |
| JP | 2003-344757 | 12/2003 |
| JP | 2004-20996 | 1/2004 |
| JP | 2004-045978 | 2/2004 |
| JP | 2004-212614 | 7/2004 |
| JP | 2004-226595 | 8/2004 |
| JP | 2006-64961 | 3/2006 |
| JP | 2006-65170 | 3/2006 |
| JP | 2006-91638 | 4/2006 |
| JP | 2006-98504 | 4/2006 |

* cited by examiner

*Primary Examiner*—Alicia M Harrington
(74) *Attorney, Agent, or Firm*—William L. Androlia; H. Henry Koda

(57) ABSTRACT

An imaging lens including, in order from an object side to an image surface side, a first lens that is a meniscus lens having a positive power whose convex surface faces the object side, a diaphragm, a second lens that is a meniscus lens having a positive power whose convex surface faces the image surface side, wherein conditions expressed by $22 \leq (r_3+r_4)/(r_3-r_4) \leq 35$ and $0.5 \leq f_1/fl \leq 1$ (where, $r_3$: center radius curvature of the object side face of the second lens, $r_4$: center radius curvature of the image surface side face of the second lens, $f_1$: focal distance of the first lens, and fl: focal distance of the entire lens system) are to be satisfied.

5 Claims, 23 Drawing Sheets

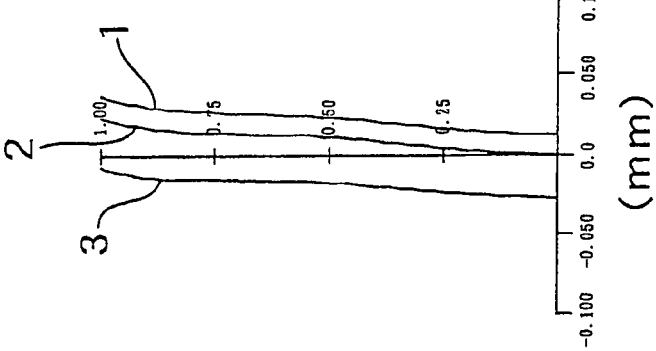
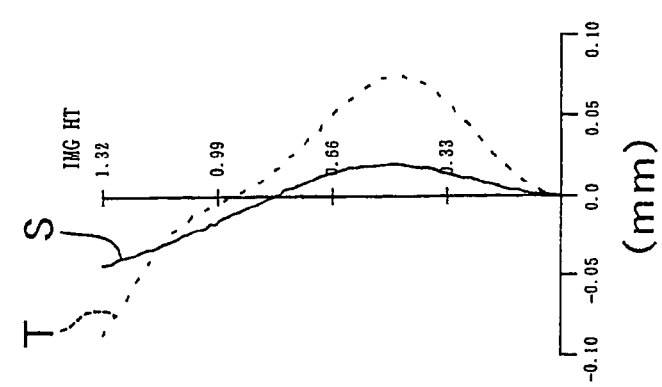
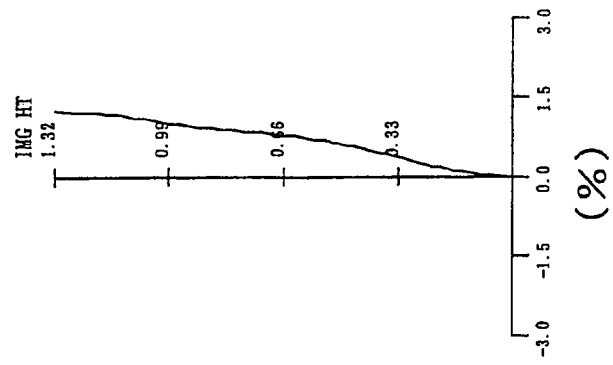
Fig.23

IMAGING LENS AND IMAGING DEVICE INCLUDING THE IMAGING LENS

BACKGROUND OF THE INVENTION

1. Field of the Invention

The present invention relates to an imaging lens and an imaging device including the imaging lens. In particular, the present invention relates to an imaging lens and an imaging device including the imaging lens, in which the imaging lens has a two-lens structure that is capable of size and weight reduction and optical performance enhancement. The imaging lens is used in a camera that forms images of objects, such as scenery and human figures, on an image-taking surface of an image sensor element, such as a charge-coupled device (CCD), a complementary metal oxide semiconductor (CMOS), etc. The image sensor element is mounted on a portable computer, a television phone, a portable phone, and the like.

2. Description of the Related Art

In recent years, there has been an increasing demand for cameras that utilize a solid image sensor element, such as the CCD, the CMOS, or the like, that is mounted on a portable phone, a portable computer, a television phone, and the like. It is demanded that a camera such as this is small and light because the camera is required to be mounted on a limited installation space.

Therefore, it is also necessary for the imaging lens used in such cameras to be similarly small and light. Conventionally, a single-lens structure lens system using a single lens has been used as such an imaging lens.

However, although a single-lens structure lens system such as this can sufficiently handle application to a solid image sensor element having a resolution of about 110 thousand pixels, called common intermediate format (CIF), the lens system cannot sufficiently utilize the resolution capabilities of a recent solid image sensor element having a high resolution of about 300 thousand pixels, called video graphics array (VGA), and recent solid image sensor elements having high resolutions of one million pixels or more (such as super extended graphics array [SXGA]).

Therefore, conventionally, various two-lens structure lens systems and three-lens structure lens systems that have superior optical performance compared to the single-lens structure lens system are proposed.

The three-lens structure lens system can effectively correct each aberration leading to deterioration of optical performance. Therefore, the three-lens structure lens system can achieve extremely high optical performance. However, the three-lens structure lens system has a large number of components, making size and weight reduction difficult. Production cost also increases because each component requires high precision.

On the other hand, although optical performance that is as high as that of the three-lens structure lens system cannot be expected of the two-lens structure lens system, a higher optical performance than that of the single-lens structure lens system can be achieved. The two-lens structure lens system is compact and suitable for a high-resolution solid image sensor element.

As such a two-lens structure lens system, for example, the lens systems described in the following Patent Literatures 1 and 2 have been used.

[Patent Literature 1] Japanese Patent Unexamined Publication 2001-174701

[Patent Literature 2] Japanese Patent Unexamined Publication 2004-45978

However, the lens system described in Patent Literature 1 is a retro-focus lens system in which a first lens having negative power and a second lens having positive power are set. Therefore, the back focus distance becomes too long. The lens system is not suitable for size and weight reduction.

Furthermore, in the lens system described in Patent Literature 2, a second lens set on an object surface side of a first lens has negative power. Therefore, the lens system is not suitable for size and weight reduction. The second lens has a strong concave surface on an image surface side. Therefore, telecentricity is poor.

SUMMARY OF THE INVENTION

The present invention has been achieved in light of the above-described problems. An object of the invention is to provide an imaging lens and an imaging device including the imaging lens, in which the imaging lens has excellent optical performance while being compact and light.

In order to achieve the aforementioned object, an imaging lens according to a first aspect of the present invention is an imaging lens used for forming an image of an object on an image-taking surface of an image sensor element comprising, in order from an object side to an image surface side: a first lens that is a meniscus lens having a positive power whose convex surface faces the object side, a diaphragm, a second lens that is a meniscus lens having a positive power whose convex surface faces the image surface side, wherein conditions expressed by the following expressions (1) and (2) are to be satisfied:

$$20 \leq (r_3 + r_4)/(r_3 - r_4) \leq 35 \tag{1}$$

$$0.5 \leq f_1/fl \leq 1 \tag{2}$$

where, $r_3$: center radius curvature of the object side face of the second lens $r_4$: center radius curvature of the image surface side face of the second lens $f_1$: focal distance of the first lens fl: focal distance of the entire lens system.

In the first aspect of the invention, the first lens is a meniscus lens having a positive power whose convex surface faces the object side. The second lens is a meniscus lens having a positive power whose convex surface faces the image surface side. The diaphragm is disposed between the first lens and the second lens. In addition, the conditions expressed by the expressions (1) and (2) are satisfied. Therefore, size and weight can be reduced, telecentricity can be secured, and aberrations, such as distortion, can be successfully corrected.

An imaging lens according to a second aspect is the imaging lens according to the first aspect, wherein, further, a condition expressed by a following expression (3) is to be satisfied:

$$0.2 \leq f_1/f_2 \leq 0.5 \tag{3}$$

where, $f_2$: focal distance of the second lens.

In the second aspect of the present invention, further, the expression (3) is satisfied. Therefore, the imaging lens can be further reduced in size and weight, and the aberrations can be more successfully corrected.

An imaging lens according to a third aspect is the imaging lens according to the first aspect, wherein, further, a condition expressed by a following expression (4) is to be satisfied:

$$-1 \leq d_4/r_3 \leq -0.5 \tag{4}$$

where, $d_4$: center thickness of the second lens.

In the third aspect of the invention, further, the expression (4) is satisfied. Therefore, aberrations, such as chromatic aberration caused by magnification, are more successfully corrected.

An imaging lens according to a fourth aspect is the imaging lens according to the first aspect, wherein, further; a condition expressed by a following expression (5) is to be satisfied:

$$0.4 \leq r_1/r_2 \leq 1 \qquad (5)$$

where, $r_1$: center radius curvature of the object side face of the first lens $r_2$: center radius curvature of the image surface side face of the first lens.

In the fourth aspect of the present invention, further, the expression (5) is satisfied. Therefore, the size and weight of the imaging lens can be further reduced, and aberrations can be more successfully corrected.

An imaging device according to a fifth aspect includes the imaging lens according to any one of aspects 1 to 4 and an image sensor element.

In the fifth aspect of the present invention, further, a compact and light imaging device having high image quality can be achieved by an imaging lens that can reduce size and weight, secure telecentricity, and successfully correct various aberrations, such as distortion, being included.

EFFECT OF THE INVENTION

According to the invention, an imaging lens and an imaging device including the imaging lens in which the imaging lens has excellent optical performance, while being compact and light, can be provided.

BRIEF DESCRIPTION OF THE DRAWINGS

FIG. 23 shows graphs for describing the spherical aberration, astigmatism, and distortion of the imaging lens shown in FIG. 22.

DETAILED DESCRIPTION OF THE PREFERRED EMBODIMENT

An embodiment of the imaging lens according to the present invention will be described hereinafter with reference to FIG. 1.

Figure 1:
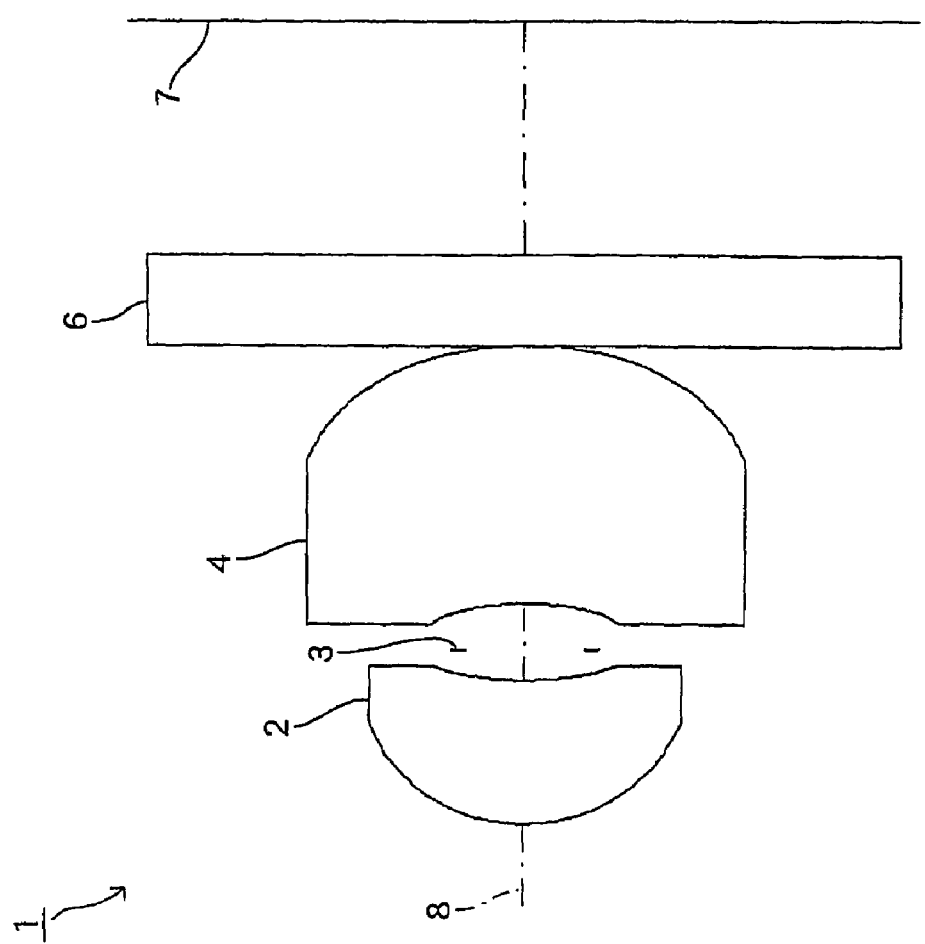
FIG. 1 is a schematic diagram for showing an embodiment of an imaging lens and an imaging device including the imaging lens according to the present invention.

As shown in FIG. 1, an imaging lens 1 according to the embodiment comprises, in order from the object side toward the image surface side, a first lens 2 that is a meniscus lens having a positive power whose convex surface faces the object side, a diaphragm 3, and a second lens 4 that is a meniscus lens having a positive power whose convex surface faces the image surface side. Each lens 2 and lens 4 are formed at a low cost using an injection-molding method using resin material.

Hereafter, each lens surface on the object side and the image surface side of the first lens 2 and the second lens are respectively a first face and a second face On the second face of the second lens 4, there are respectively disposed various filters 6, such as a cover glass, an infrared (IR) cut filter, and a lowpass filter, and an image-taking surface 7 that is a light-receiving surface of an image sensor element (solid image sensor element), such as a CCD or a CMOS. The imaging device is composed of the image sensor element, the lens 2, the lens 4, and the diaphragm 3. The various filters 6 may be omitted as required.

Here, when either one of the first lens 2 or the second lens 4 is a lens having a negative power, size reduction of the optical system becomes difficult. When the diaphragm 3 is disposed on the object side of the first lens 2, distortion correction becomes difficult because the configuration is asymmetrical to the diaphragm 3.

Therefore, according to the embodiment, the first lens 2 is a meniscus lens having a positive power whose convex surface faces the object side. The second lens 4 is a meniscus lens having a positive power whose convex surface faces the image surface side. The diaphragm 3 is disposed between the first lens 2 and the second lens 4. Therefore, the size and weight reduction of the imaging lens 1 and the imaging device and distortion correction can both be achieved.

According to the embodiment, the first lens satisfies a condition expressed by the following expressions (1) and (2):

$$20 \leq (r_3+r_4)/(r_3-r_4) \leq 35 \qquad (1)$$

$$0.5 \leq f_1/fl \leq 1 \qquad (2)$$

where, $r_3$ in the expression (1) is the center radius curvature of the first face of the second lens 4 (the same applies hereafter). $r_4$ in the expression (1) is the center radius curvature of the second face of the second lens 4 (the same applies hereafter). $f_1$ in the expression (2) is the focal distance of the first lens 2 (the same applies hereafter). fl in the expression (2) is the focal distance of the entire lens system (the same applies hereafter).

When the value of $(r_3+r_4)/(r_3-r_4)$ is greater than the value (35) in the expression (1), exit pupil position is too close to the image-taking surface 7. Telecentricity deteriorates. At the same time, when the value of $(r_3+r_4)/(r_3-r_4)$ is less than the value (20) in the expression (1), distortion correction becomes difficult.

Therefore, according to the embodiment, by the value of $(r_3+r_4)/(r_3-r_4)$ being set to satisfy the expression (1), telecentricity can be enhanced, and distortion can be corrected.

When the value of $f_1/fl$ is greater than the value (1) in the expression (2), the power of the first lens 2 becomes too weak. Size reduction of the optical system becomes difficult. At the same time, when the value of $f_1/fl$ is less than the value (0.5) in the expression (2), the power of the first lens 2 becomes too strong. Aberration correction becomes difficult.

Therefore, according to the embodiment, by the value of $f_1/fl$ being set to satisfy the expression (2), telecentricity can be further enhanced. Size and weight reduction of the imaging lens 1 and the imaging device and successful aberration correction can both be more effectively achieved.

The relationship between $f_1$ and fl is more preferably $0.7 \leq f_1/fl \leq 1$.

In addition to the above-described configuration, according to the embodiment, a condition expressed by a following expression (3) is satisfied:

$$0.2 \leq f_1/f_2 \leq 0.5 \qquad (3)$$

where, $f_2$ in the expression (3) is the focal distance of the second lens 4 (the same applies hereafter).

When the value of $f_1/f_2$ is greater than the value (0.5) in the expression (3), size reduction of the optical system becomes difficult. At the same time, when the value of $f_1/f_2$ is less than the value (0.2) in the expression (3), correction of coma aberration, chromatic aberration caused by magnification, and the like becomes difficult.

Therefore, according to the embodiment, by the value of $f_1/f_2$ being set to satisfy the expression (3), a good balance between size and weight reduction of the imaging lens 1 and the imaging device and aberration correction can be further achieved.

The relationship between $f_1$ and $f_2$ is more preferably $0.2 \leq f_1/f_2 \leq 0.4$.

In addition to the above-described configuration, according to the embodiment, a condition expressed by a following expression (4) is satisfied:

$$-1 \leq d_4/r_3 \leq -0.5 \qquad (4)$$

where, $d_4$ in the expression (4) is the center thickness of the second lens 4 (the same applies hereafter).

When the value of $d_4/r_3$ is greater than the value (−0.5) in the expression (4), the power of the first face of the second lens 4 becomes too weak. Correction of chromatic aberration caused by magnification and field curvature becomes difficult. At the same time, when the value of $d_4/r_3$ is less than the value (−1) in the expression (4), negative distortion increases and astigmatism increases.

Therefore, according to the embodiment, by the value of $d_4/r_3$ being set to satisfy the expression (4), balance between correction of chromatic aberration caused by magnification and field curvature and correction of negative distortion and astigmatism can be successfully achieved without bias against either.

The relationship between $d_4$ and $r_3$ is more preferably $-0.9 \leq d_4/r_3 \leq -0.6$.

In addition to the above-described configuration, according to the embodiment, a condition expressed by a following expression (5) is satisfied:

$$0.4 \leq r_1/r_2 \leq 1 \qquad (5)$$

where, $r_1$ in the expression (5) is the center radius curvature of the first face of the first lens 2 (the same applies hereafter). $r_2$ in the expression (5) is the center radius curvature of the second face of the first lens 2 (the same applies hereafter).

When the value of $r_1/r_2$ is greater than the value (1) in the expression (5), correction of spherical aberration, astigmatism, and distortion and size and weight reduction become difficult. At the same time, when the value of $r_1/r_2$ is less than the value (0.4) in the expression (5), correction of spherical aberration, coma aberration, and astigmatism becomes difficult.

Therefore, according to the embodiment, by the value of $r_1/r_2$ being set to satisfy the expression (5), size and weight can be further reduced, and spherical aberration, coma aberration, astigmatism, and distortion can be more successfully corrected.

The relationship between $r_1$ and $r_2$ is more preferably $0.5 \leq r_1/r_2 \leq 08$.

EXAMPLES

Next, EXAMPLES of the present invention will be described with reference to FIG. 2 to FIG. 23.

In the EXAMPLES, F no denotes F number, ω denotes half of the angle-of-view (angle of view of opposing angles), and r denotes the radius curvature of an optical surface (center radius curvature of a lens surface). Further, d denotes a distance to the next optical surface, nd denotes the index of refraction of each optical system when the d line (yellow) is irradiated, and vd denotes the Abbe number of each optical system also when the d line is irradiated.

k, A, B, C, and D denote each coefficient in a following expression (6). Specifically, the shape of the aspherical surface of the lens is expressed by the following expression provided that the direction of the optical axis 8 is taken as the Z axis, the direction orthogonal to the optical axis 8 as the X axis, the traveling direction of light is positive, k is the constant of cone, A, B, C, and D are the aspherical coefficients, and r is the center radius curvature.

$$Z(X) = r^{-1}X^2/[1+\{1-(k+1)r^{-2}X^2\}^{1/2}] + AX^4 + BX^6 + CX^8 + DX^{10} \quad (6)$$

In the following EXAMPLES, reference code E used for a numerical value denoting the constant of cone and the aspherical coefficient indicates that the numerical value following E is an exponent having 10 as the base and that the numerical value before E is multiplied by the numerical value denoted by the exponent having 10 as the base. For example, $-1.59\text{E-}2$ denotes $-1.59 \times 10^{-2}$.

First Example

Figure 2:
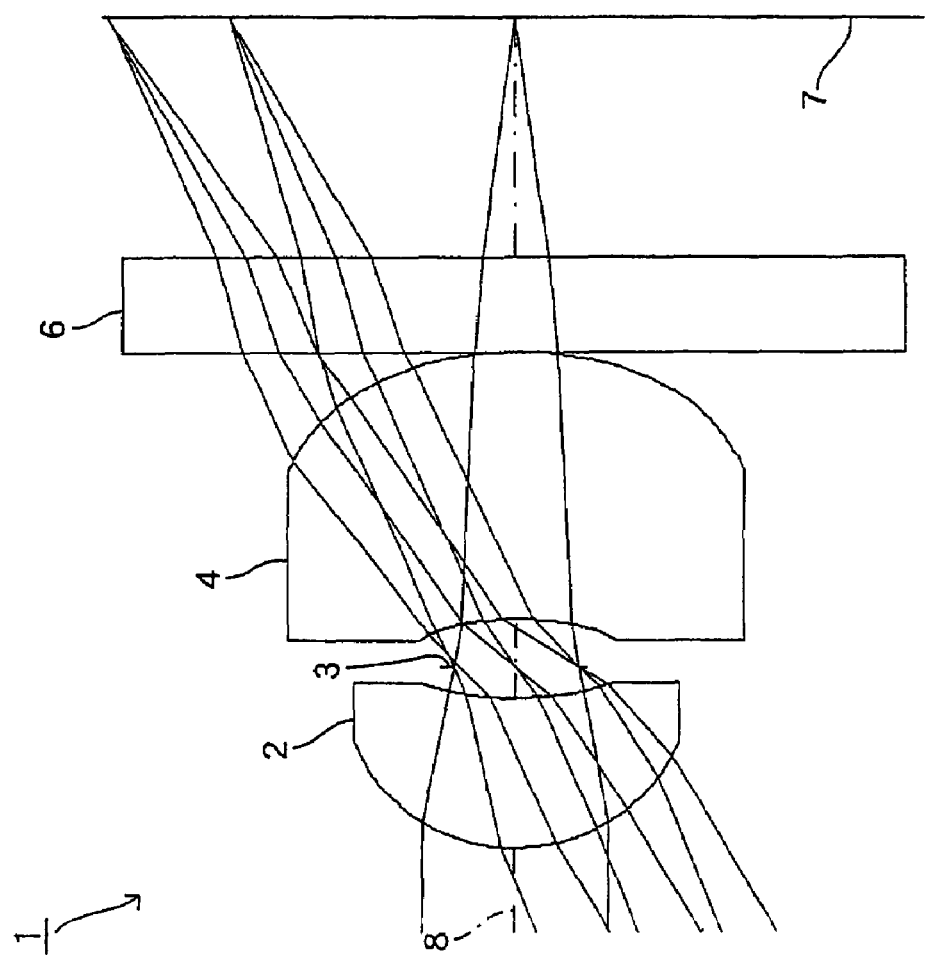
FIG. 2 is a schematic diagram for showing a FIRST EXAMPLE of the imaging lens according to the present invention.

FIG. 2 shows an imaging lens 1 that is the same imaging lens 1 as that shown in FIG. 1 as the FIRST EXAMPLE of the present invention. In the example, a cover glass serving as the filter 6 is disposed between the second face of the second lens 4 and the image-taking surface 7.

The imaging lens 1 of the FIRST EXAMPLE was set under the following conditions:

Lens Data
fl = 2.13 mm, $f_1$ = 1.92 mm, $f_2$ = 7.43 mm, F no = 3.5, ω = 64.1°

| Face Number | r | d | nd | vd |
|---|---|---|---|---|
| (Object Point) | | | | |
| 1 (First Face of First Lens) | 0.61 | 0.48 | 1.5310 | 56.0 |
| 2 (Second Face of First Lens) | 1.10 | 0.10 | | |
| 3 (Diaphragm) | 0.00 | 0.15 | | |
| 4 (First Face of Second Lens) | −1.23 | 0.85 | 1.5310 | 56.0 |
| 5 (Second Face of Second Lens) | −1.16 | 0.00 | | |
| 6 (First Face of Cover Glass) | 0.00 | 0.30 | 1.5168 | 64.0 |
| 7 (Second Face of Cover Glass) | 0.00 | | | |
| (Image Surface) | | | | |

| Face Number | k | A | B | C | D |
|---|---|---|---|---|---|
| 1 | 0 | −1.59E−2 | 1.52 | −8.72 | 2.71E+1 |
| 2 | −7.60E−2 | 1.58E−1 | 2.14 | 3.79E+1 | −4.77E+2 |
| 4 | 0 | −1.74 | 8.93 | −1.80E+2 | 0 |
| 5 | 1.19 | 2.50E−1 | −1.46 | 2.95 | −2.49 |

Under such conditions, $(r_3+r_4)/(r_3-r_4)=35$ was achieved, thereby satisfying the expression (1). $f_1/\text{fl}=0.90$ was achieved, thereby satisfying the expression (2). $f_1/f_2=0.26$ was achieved, thereby satisfying the expression (3). $d_4/r_3=-0.69$ was achieved, thereby satisfying the expression (4). $r_1/r_2=0.55$ was achieved, thereby satisfying the expression (5).

Figure 3:
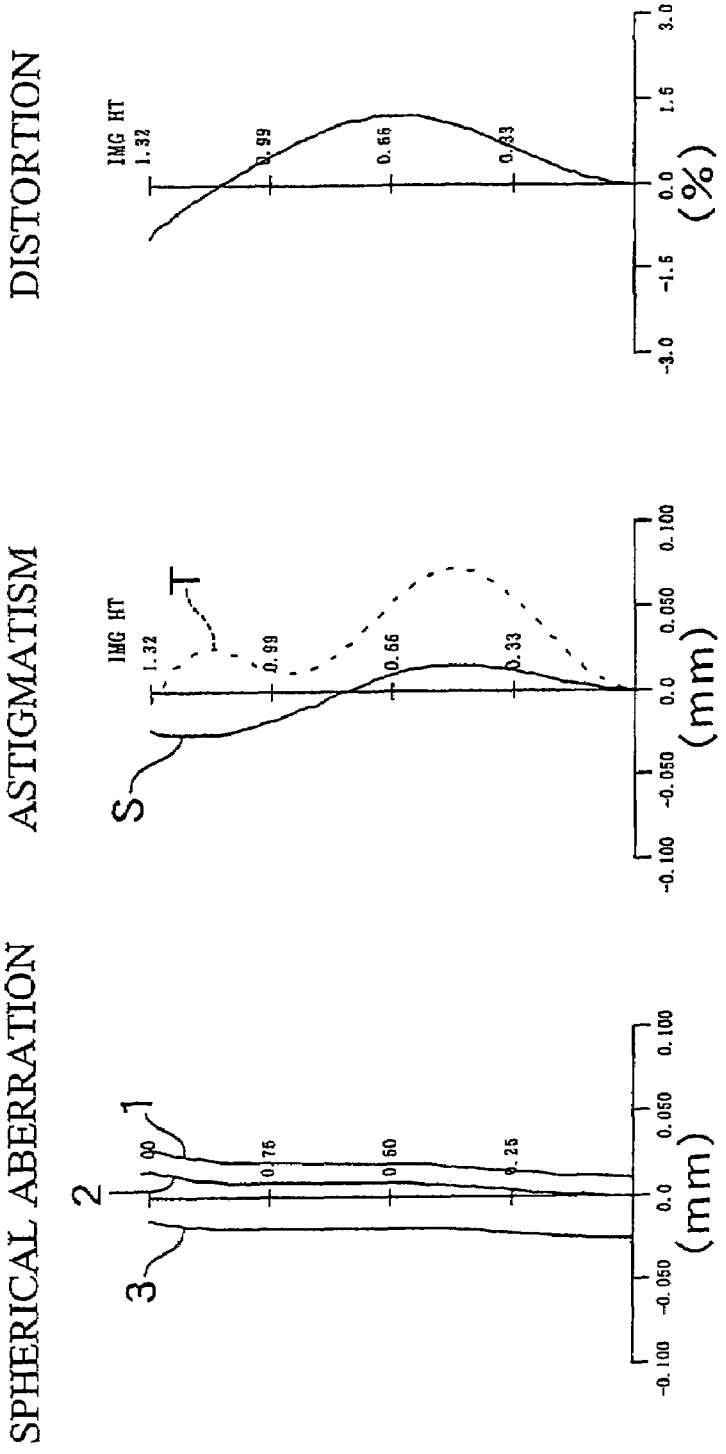
FIG. 3 shows graphs for describing the spherical aberration, astigmatism, and distortion of the imaging lens shown in FIG. 2.

FIG. 3 shows the spherical aberration, the astigmatism and the distortion in the imaging lens 1 of the FIRST EXAMPLE.

According to the result, each of the spherical aberration, the astigmatism, and the distortion was almost satisfied. It can be seen from the result that a sufficiently excellent optical property can be obtained.

Second Example

Figure 4:
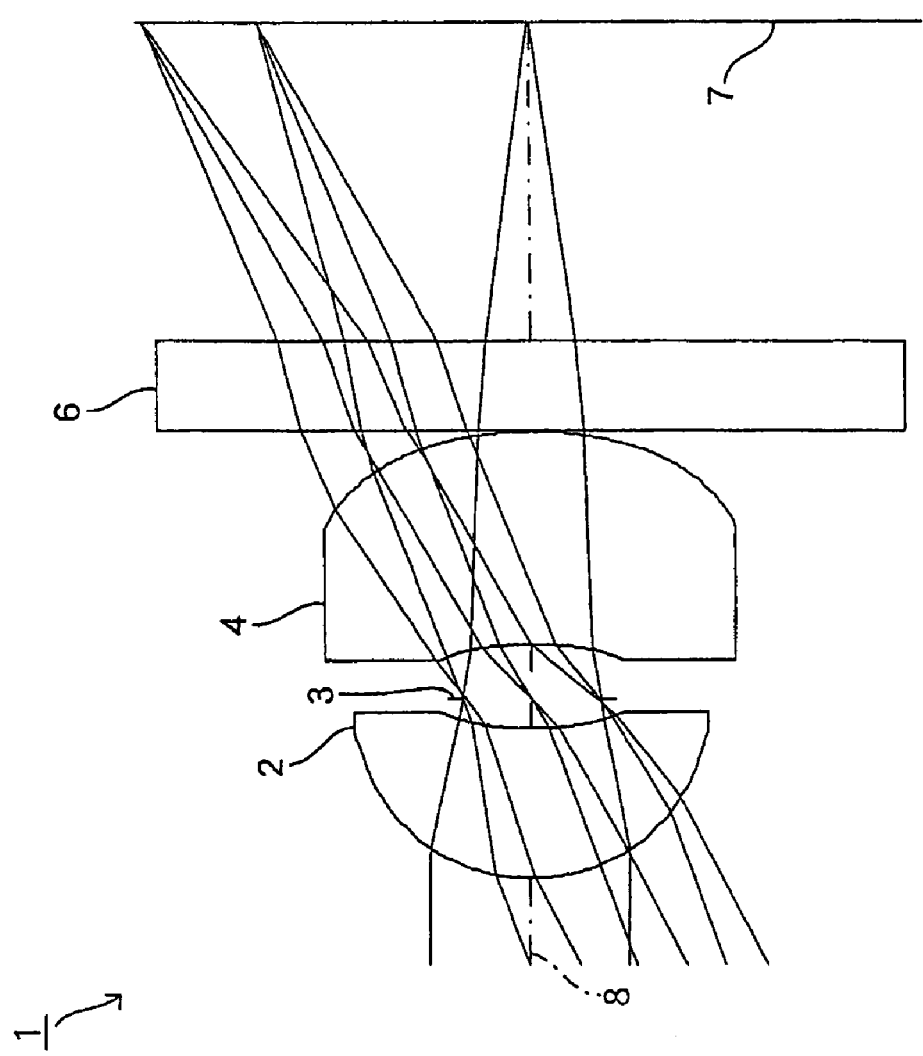
FIG. 4 is a schematic diagram for showing a SECOND EXAMPLE of the imaging lens according to the present invention.

FIG. 4 shows a SECOND EXAMPLE of the present invention. In the example, as in the FIRST EXAMPLE, a cover glass serving as the filter 6 is disposed between the second face of the second lens 4 and the image-taking surface 7.

The imaging lens 1 of the SECOND EXAMPLE was set under the following conditions:

Lens Data
fl = 2.41 mm, $f_1$ = 2.29 mm, $f_2$ = 9.82 mm, F no = 3.5, ω = 57.8°

| Face Number | r | d | nd | vd |
|---|---|---|---|---|
| (Object Point) | | | | |
| 1 (First Face of First Lens) | 0.64 | 0.50 | 1.5310 | 56.0 |
| 2 (Second Face of First Lens) | 0.98 | 0.10 | | |
| 3 (Diaphragm) | 0.00 | 0.18 | | |
| 4 (First Face of Second Lens) | −1.36 | 0.70 | 1.5310 | 56.0 |
| 5 (Second Face of Second Lens) | −1.27 | 0.00 | | |
| 6 (First Face of Cover Glass) | 0.00 | 0.30 | 1.5168 | 64.0 |
| 7 (Second Face of Cover Glass) | 0.00 | | | |
| (Image Surface) | | | | |

| Face Number | k | A | B | C | D |
|---|---|---|---|---|---|
| 1 | 0 | −7.40E−3 | 1.28 | −7.03 | 2.06E+1 |
| 2 | −5.64E−1 | 6.13E−1 | −7.36 | 1.64E+2 | −9.40E+2 |
| 4 | 0 | −1.21 | 3.42 | −7.79E+1 | 0 |
| 5 | 1.77 | 8.43E−2 | −1.05 | 2.56 | −3.05 |

Under such conditions, $(r_3+r_4)/(r_3-r_4)=30$ was achieved, thereby satisfying the expression (1). $f_1/\text{fl}=0.95$ was achieved, thereby satisfying the expression (2) $f_1/f_2=0.23$ was achieved, thereby satisfying the expression (3). $d_4/r_3=-0.52$ was achieved, thereby satisfying the expression (4). $r_1/r_2=0.65$ was achieved, thereby satisfying the expression (5).

Figure 5:
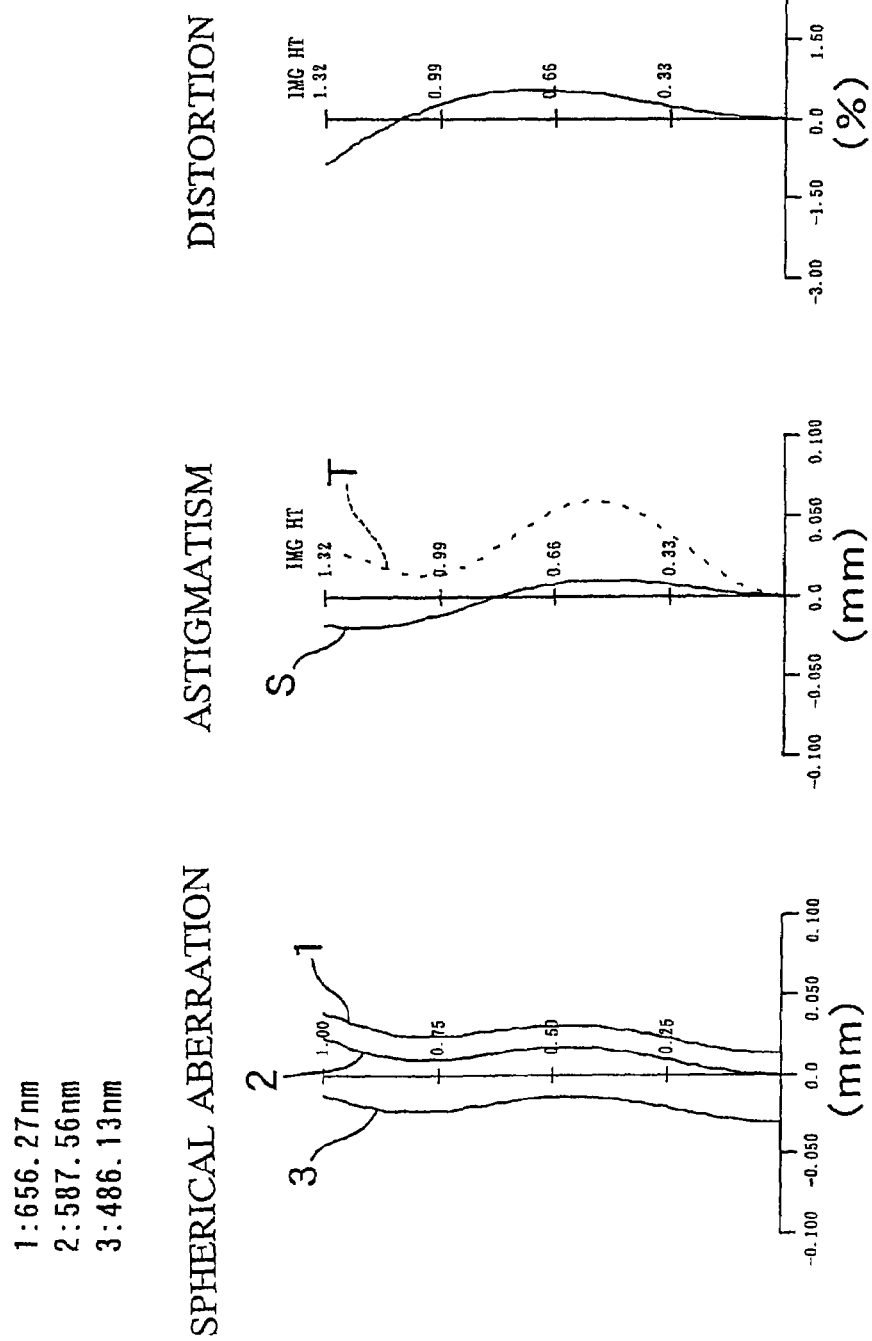
FIG. 5 shows graphs for describing the spherical aberration, astigmatism, and distortion of the imaging lens shown in FIG. 4.

FIG. 5 shows the spherical aberration, the astigmatism and the distortion in the imaging lens 1 of the SECOND EXAMPLE.

According to the result, each of the spherical aberration, the astigmatism, and the distortion was almost satisfied. It can be seen from the result that a sufficiently excellent optical property can be obtained.

Third Example

Figure 6:
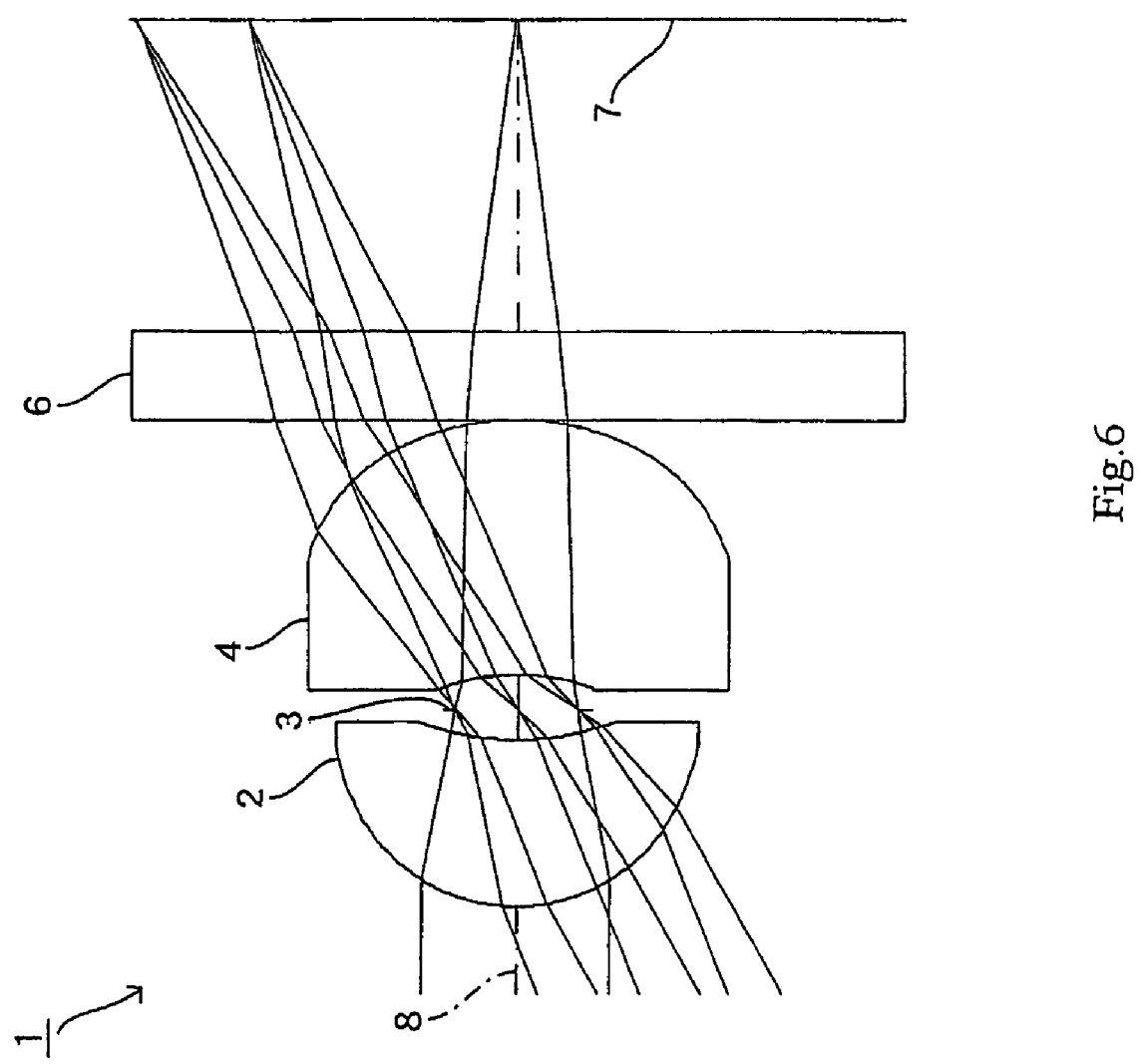
FIG. 6 is a schematic diagram for showing a THIRD EXAMPLE of the imaging lens according to the present invention.

FIG. 6 shows a THIRD EXAMPLE of the present invention. In the example, as in the FIRST EXAMPLE, a cover glass serving as the filter 6 is disposed between the second face of the second lens 4 and the image-taking surface 7.

The imaging lens 1 of the THIRD EXAMPLE was set under the following conditions:

Lens Data
fl = 2.33 mm, $f_1$ = 2.21 mm, $f_2$ = 5.03 mm, F no = 3.5, ω = 59.7°

| Face Number | r | d | nd | vd |
|---|---|---|---|---|
| (Object Point) | | | | |
| 1 (First Face of First Lens) | 0.64 | 0.56 | 1.5310 | 56.0 |
| 2 (Second Face of First Lens) | 0.99 | 0.10 | | |
| 3 (Diaphragm) | 0.00 | 0.12 | | |
| 4 (First Face of Second Lens) | −1.00 | 0.85 | 1.5310 | 56.0 |
| 5 (Second Face of Second Lens) | −0.94 | 0.00 | | |
| 6 (First Face of Cover Glass) | 0.00 | 0.30 | 1.5168 | 64.0 |
| 7 (Second Face of Cover Glass) | 0.00 | | | |
| (Image Surface) | | | | |

-continued

Lens Data
fl = 2.33 mm, $f_1$ = 2.21 mm, $f_2$ = 5.03 mm, F no = 3.5, ω = 59.7°

| Face Number | k | A | B | C | D |
|---|---|---|---|---|---|
| 1 | 0 | −1.79E−2 | 1.21 | −5.60 | 1.45E+1 |
| 2 | −1.49E−1 | 1.07E−1 | 1.18E−1 | 2.57E+1 | −3.69E+2 |
| 4 | 0 | −1.83 | 9.58 | −2.47E+2 | 0 |
| 5 | 6.11E−1 | 1.18E−1 | −8.76E−1 | 2.10 | −2.15 |

Under such conditions, $(r_3+r_4)/(r_3-r_4)=35$ was achieved, thereby satisfying the expression (1). $f_1/fl=0.95$ was achieved, thereby satisfying the expression (2). $f_1/f_2=0.44$ was achieved, thereby satisfying the expression (3). $d_4/r_3=-0.85$ was achieved, thereby satisfying the expression (4). $r_1/r_2=0.65$ was achieved, thereby satisfying the expression (5).

Figure 7:
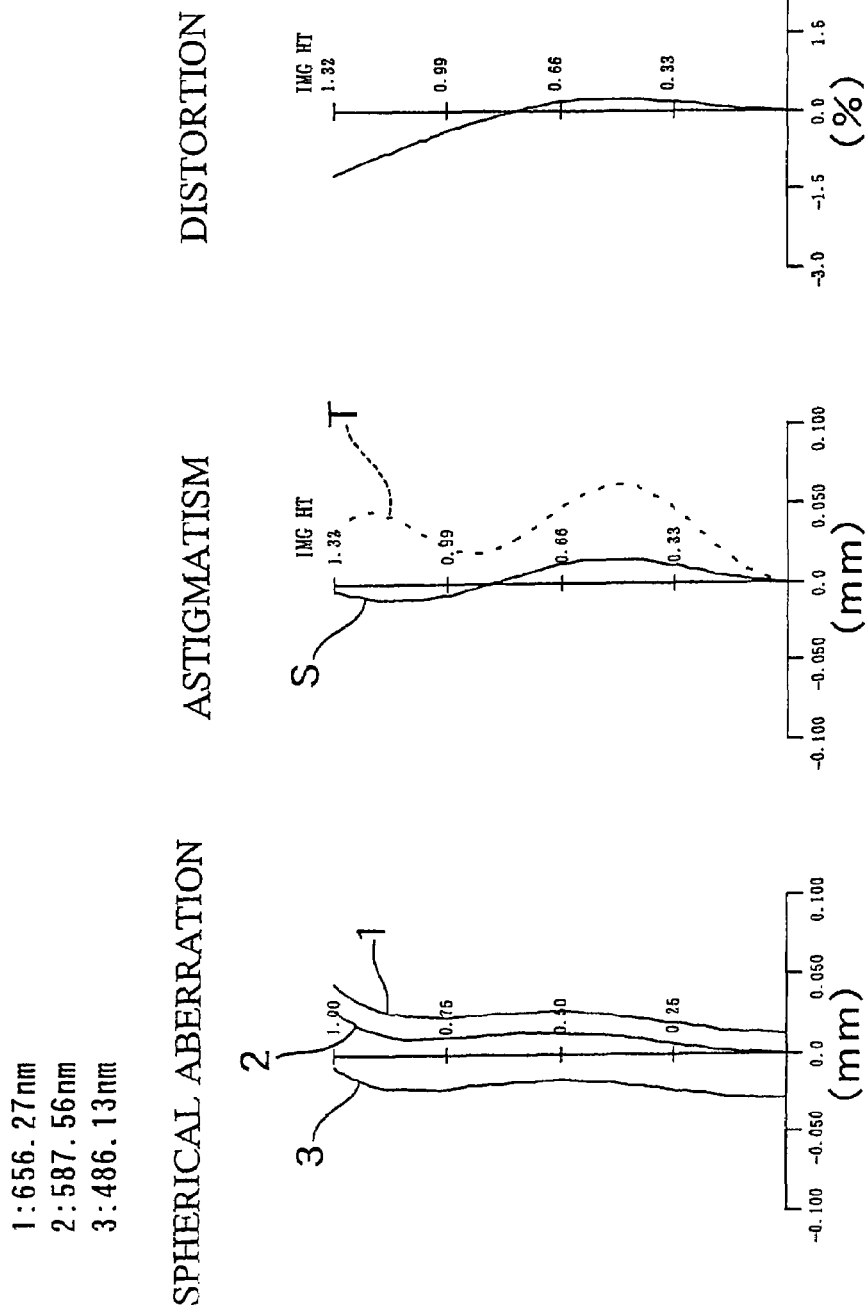
FIG. 7 shows graphs for describing the spherical aberration, astigmatism, and distortion of the imaging lens shown in FIG. 6.

FIG. 7 shows the spherical aberration, the astigmatism and the distortion in the imaging lens 1 of the THIRD EXAMPLE.

According to the result, each of the spherical aberration, the astigmatism, and the distortion was almost satisfied. It can be seen from the result that a sufficiently excellent optical property can be obtained.

Fourth Example

Figure 8:
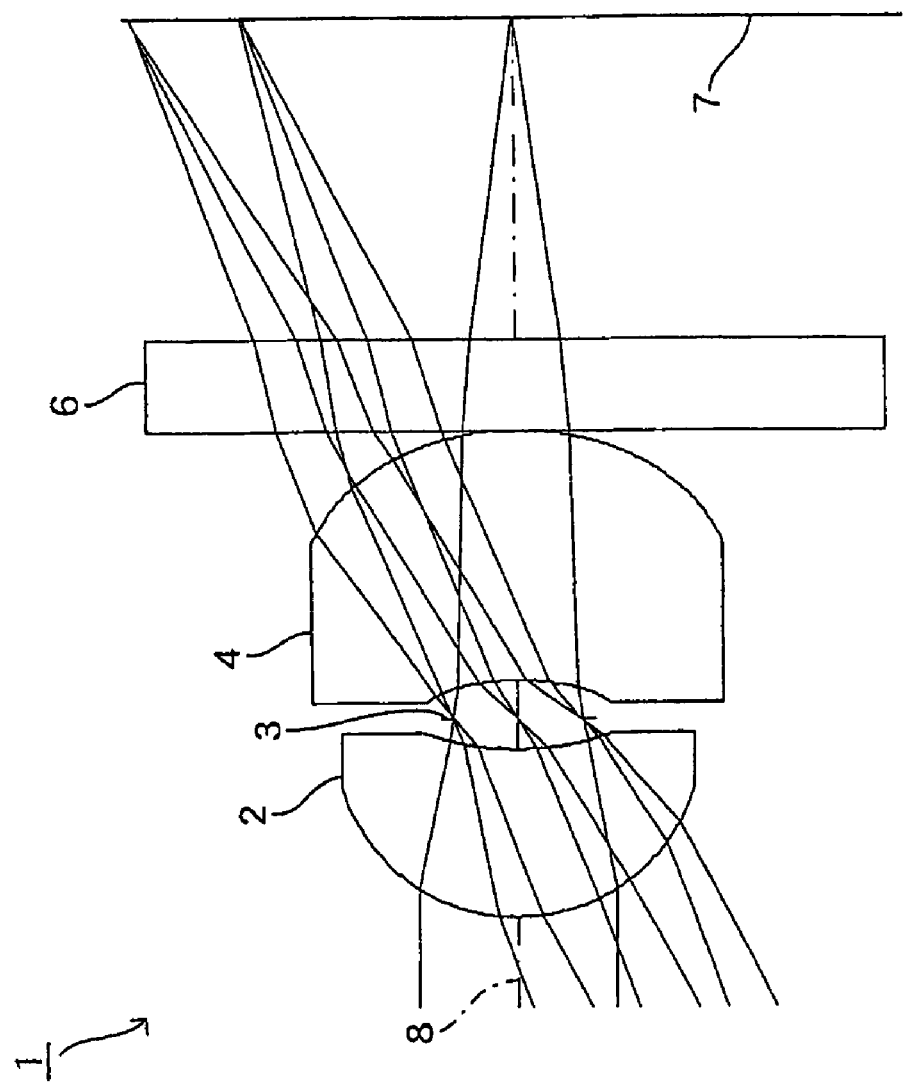
FIG. 8 is a schematic diagram for showing a FOURTH EXAMPLE of the imaging lens according to the present invention.

FIG. 8 shows a FOURTH EXAMPLE of the present invention. In the example, as in the FIRST EXAMPLE, a cover glass serving as the filter 6 is disposed between the second face of the second lens 4 and the image-taking surface 7.

The imaging lens 1 of the FOURTH EXAMPLE was set under the following conditions:

Lens Data
fl = 2.39 mm, $f_1$ = 2.28 mm, $f_2$ = 5.77 mm, F no = 3.5, ω = 58.3°

| Face Number | r | d | nd | vd |
|---|---|---|---|---|
| (Object Point) | | | | |
| 1 (First Face of First Lens) | 0.66 | 0.56 | 1.5310 | 56.0 |
| 2 (Second Face of First Lens) | 1.01 | 0.10 | | |
| 3 (Diaphragm) | 0.00 | 0.13 | | |
| 4 (First Face of Second Lens) | −1.06 | 0.83 | 1.5310 | 56.0 |
| 5 (Second Face of Second Lens) | −1.00 | 0.00 | | |
| 6 (First Face of Cover Glass) | 0.00 | 0.30 | 1.5168 | 64.0 |
| 7 (Second Face of Cover Glass) (Image Surface) | 0.00 | | | |

| Face Number | k | A | B | C | D |
|---|---|---|---|---|---|
| 1 | 0 | −1.00E−2 | 1.09 | −5.01 | 1.30E+1 |
| 2 | 7.08E−1 | 1.88E−1 | −5.06 | 1.07E+2 | −7.60E+2 |
| 4 | 0 | −1.59 | 6.93 | −1.77E+2 | 0 |
| 5 | 7.78E−1 | 8.89E−2 | −7.44E−1 | 1.76 | −1.87 |

Under such conditions, $(r_3+r_4)/(r_3-r_4)=34$ was achieved, thereby satisfying the expression (1). $f_1/fl=0.95$ was achieved, thereby satisfying the expression (2). $f_1/f_2=0.39$ was achieved, thereby satisfying the expression (3) $d_4/r_3=-0.78$ was achieved, thereby satisfying the expression (4). $r_1/r_2=0.65$ was achieved, thereby satisfying the expression (5).

Figure 9:
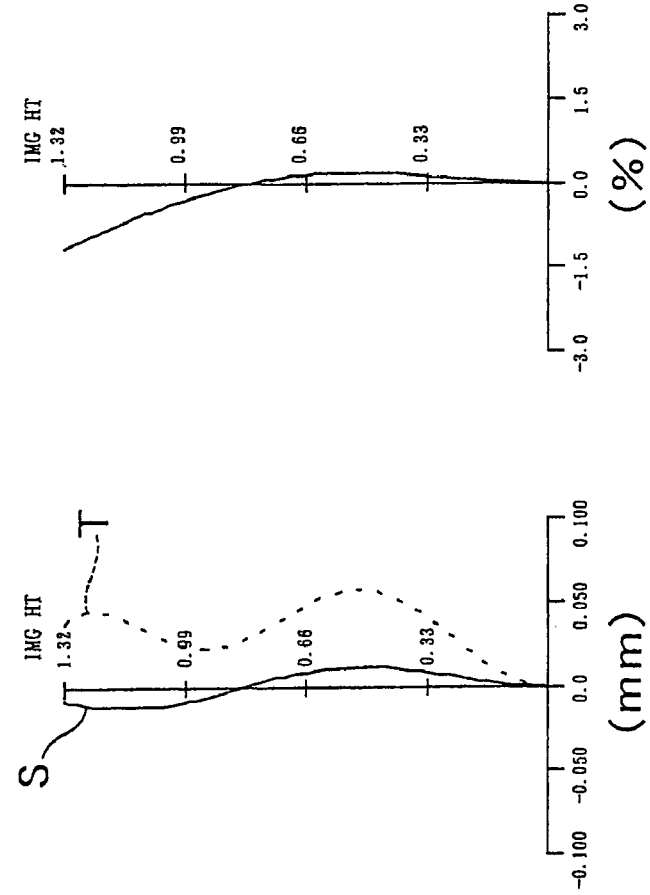
FIG. 9 shows graphs for describing the spherical aberration, astigmatism, and distortion of the imaging lens shown in FIG. 8.

FIG. 9 shows the spherical aberration, the astigmatism and the distortion in the imaging lens 1 of the FOURTH EXAMPLE.

According to the result, each of the spherical aberration, the astigmatism, and the distortion was almost satisfied. It can be seen from the result that a sufficiently excellent optical property can be obtained.

Fifth Example

Figure 10:
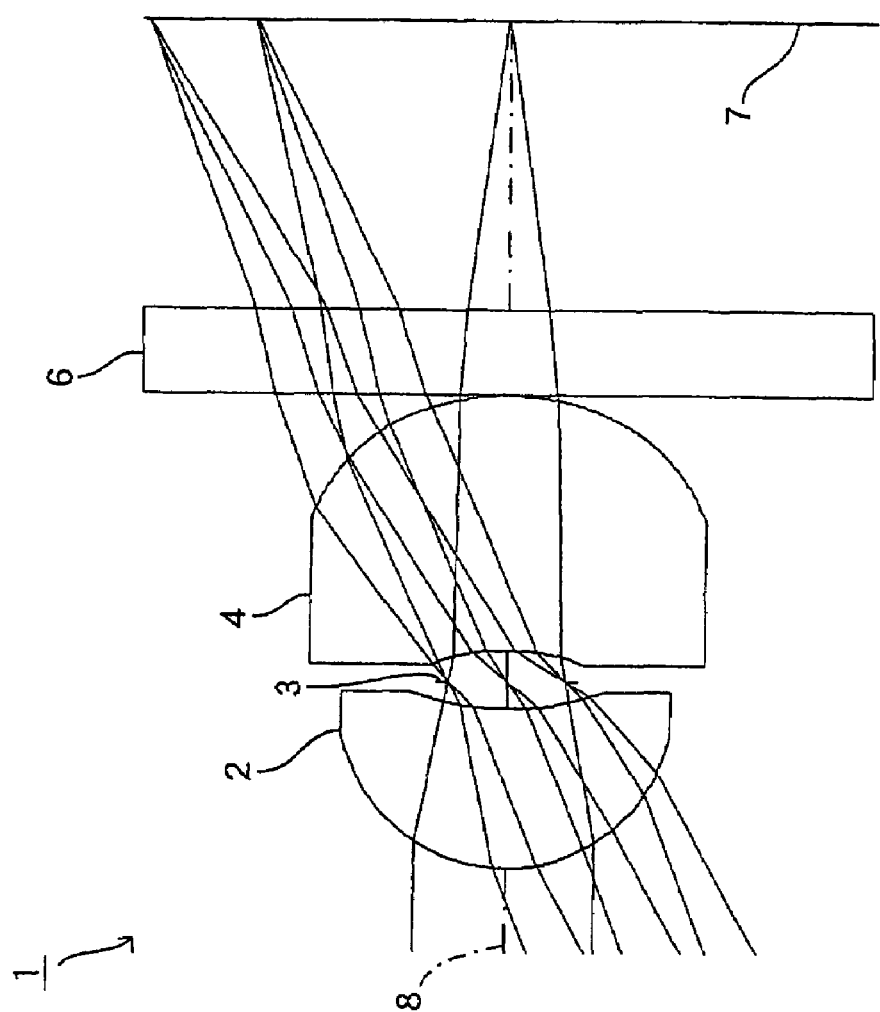
FIG. 10 is a schematic diagram for showing a FIFTH EXAMPLE of the imaging lens according to the present invention.

FIG. 10 shows a FIFTH EXAMPLE of the present invention. In the example, as in the FIRST EXAMPLE, a cover glass serving as the filter 6 is disposed between the second face of the second lens 4 and the image-taking surface 7.

The imaging lens 1 of the FIFTH EXAMPLE was set under the following conditions:

Lens Data
fl = 2.33 mm, $f_1$ = 2.22 mm, $f_2$ = 4.54 mm, F no = 3.5, ω = 59.7°

| Face Number | r | d | nd | vd |
|---|---|---|---|---|
| (Object Point) | | | | |
| 1 (First Face of First Lens) | 0.64 | 0.56 | 1.5310 | 56.0 |
| 2 (Second Face of First Lens) | 0.99 | 0.10 | | |
| 3 (Diaphragm) | 0.00 | 0.11 | | |
| 4 (First Face of Second Lens) | −0.97 | 0.90 | 1.5310 | 56.0 |
| 5 (Second Face of Second Lens) | −0.91 | 0.00 | | |
| 6 (First Face of Cover Glass) | 0.00 | 0.30 | 1.5168 | 64.0 |
| 7 (Second Face of Cover Glass) (Image Surface) | 0.00 | | | |

| Face Number | k | A | B | C | D |
|---|---|---|---|---|---|
| 1 | 0 | −2.02E−2 | 1.23 | −5.57 | 1.43E+1 |
| 2 | −7.01E−2 | 2.22E−2 | 2.13 | −1.44E+1 | −1.40E+2 |
| 4 | 0 | −1.95 | 1.16E+1 | −2.83E+2 | 0 |
| 5 | 4.68E−1 | 1.01E−1 | −6.83E−1 | 1.55 | −1.49 |

Under such conditions, $(r_3+r_4)/(r_3-r_4)=34$ was achieved, thereby satisfying the expression (1). $f_1/fl=0.95$ was achieved, thereby satisfying the expression (2). $f_1/f_2=0.49$ was achieved, thereby satisfying the expression (3). $d_4/r_3=-0.93$ was achieved, thereby satisfying the expression (4). $r_1/r_2=0.65$ was achieved, thereby satisfying the expression (5).

Figure 11:
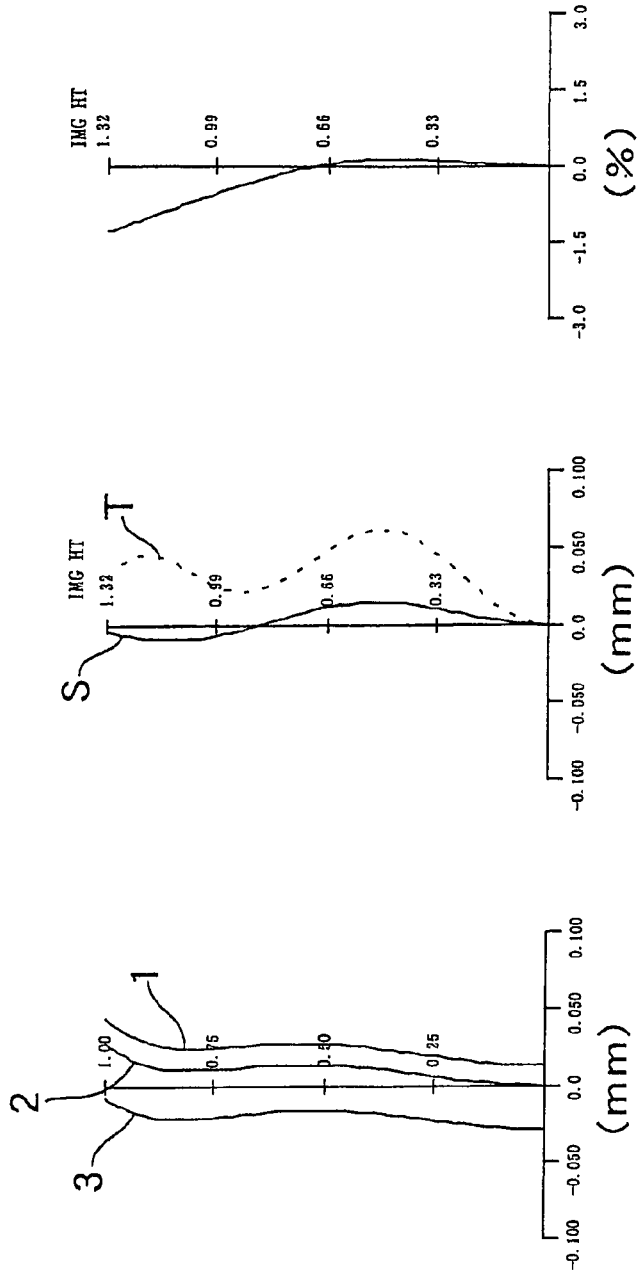
FIG. 11 shows graphs for describing the spherical aberration, astigmatism, and distortion of the imaging lens shown in FIG. 10.

FIG. 11 shows the spherical aberration, the astigmatism and the distortion in the imaging lens 1 of the FIFTH EXAMPLE.

According to the result, each of the spherical aberration, the astigmatism, and the distortion was almost satisfied. It can be seen from the result that a sufficiently excellent optical property can be obtained.

Sixth Example

Figure 12:
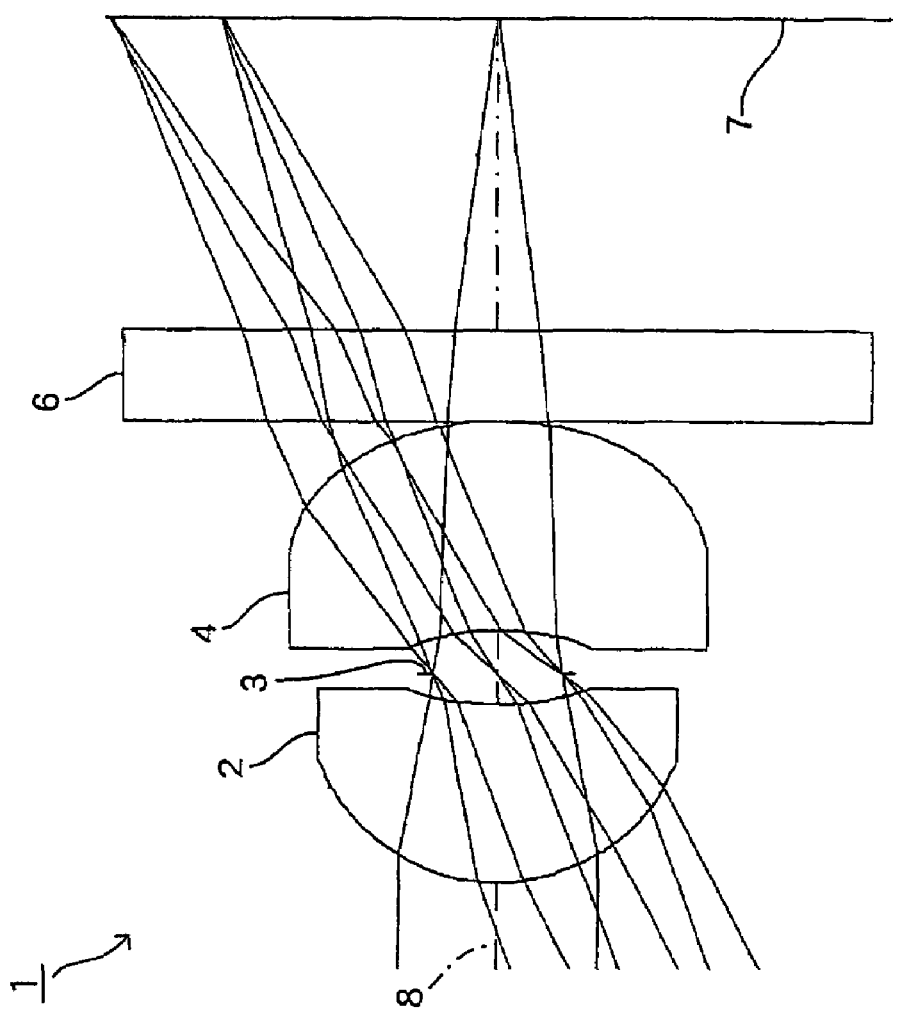
FIG. 12 is a schematic diagram for showing a SIXTH EXAMPLE of the imaging lens according to the present invention.

FIG. 12 shows a SIXTH EXAMPLE of the present invention. In the example, as in the FIRST EXAMPLE, a cover glass serving as the filter 6 is disposed between the second face of the second lens 4 and the image-taking surface 7.

The imaging lens 1 of the SIXTH EXAMPLE was set under the following conditions:

Lens Data
fl = 2.41 mm, $f_1$ = 2.29 mm, $f_2$ = 8.35 mm, F no = 3.5, ω = 57.9°

| Face Number | r | d | nd | vd |
|---|---|---|---|---|
| (Object Point) | | | | |
| 1 (First Face of First Lens) | 0.67 | 0.58 | 1.5310 | 56.0 |

-continued

Lens Data
fl = 2.41 mm, $f_1$ = 2.29 mm, $f_2$ = 8.35 mm, F no = 3.5, ω = 57.9°

| | | | | |
|---|---|---|---|---|
| 2 (Second Face of First Lens) | 1.02 | 0.10 | | |
| 3 (Diaphragm) | 0.00 | 0.15 | | |
| 4 (First Face of Second Lens) | −1.20 | 0.69 | 1.5310 | 56.0 |
| 5 (Second Face of Second Lens) | −1.13 | 0.00 | | |
| 6 (First Face of Cover Glass) | 0.00 | 0.30 | 1.5168 | 64.0 |
| 7 (Second Face of Cover Glass) (Image Surface) | 0.00 | | | |

| Face Number | k | A | B | C | D |
|---|---|---|---|---|---|
| 1 | 0 | −1.88E−2 | 7.18E−1 | −3.22 | 7.69 |
| 2 | 5.41E−1 | 2.62E−1 | −4.96 | 9.88E+1 | −6.28E+2 |
| 4 | 0 | −1.46 | 5.70 | −1.33E+2 | 0 |
| 5 | 1.53 | 7.40E−2 | −1.09 | 2.95 | −3.78 |

Under such conditions, $(r_3+r_4)/(r_3-r_4)=35$ was achieved, thereby satisfying the expression (1). $f_1/fl=0.95$ was achieved, thereby satisfying the expression (2). $f_1/f_2=0.27$ was achieved, thereby satisfying the expression (3). $d_4/r_3=-0.57$ was achieved, thereby satisfying the expression (4). $r_1/r_2=0.65$ was achieved, thereby satisfying the expression (5).

Figure 13:
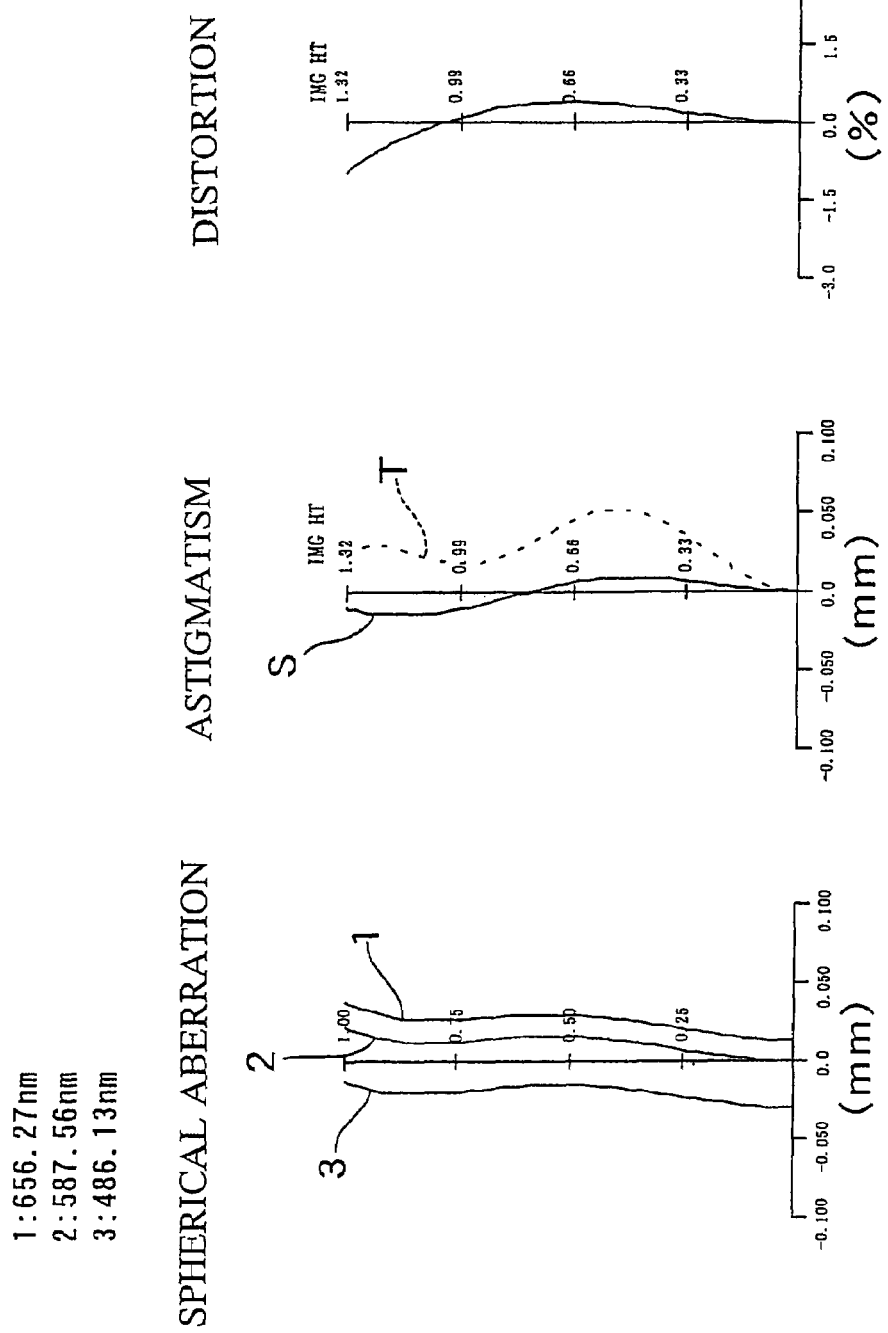
FIG. 13 shows graphs for describing the spherical aberration, astigmatism, and distortion of the imaging lens shown in FIG. 12.

FIG. 13 shows the spherical aberration, the astigmatism and the distortion in the imaging lens 1 of the SIXTH EXAMPLE.

According to the result, each of the spherical aberration, the astigmatism, and the distortion was almost satisfied. It can be seen from the result that a sufficiently excellent optical property can be obtained.

Seventh Example

Figure 14:
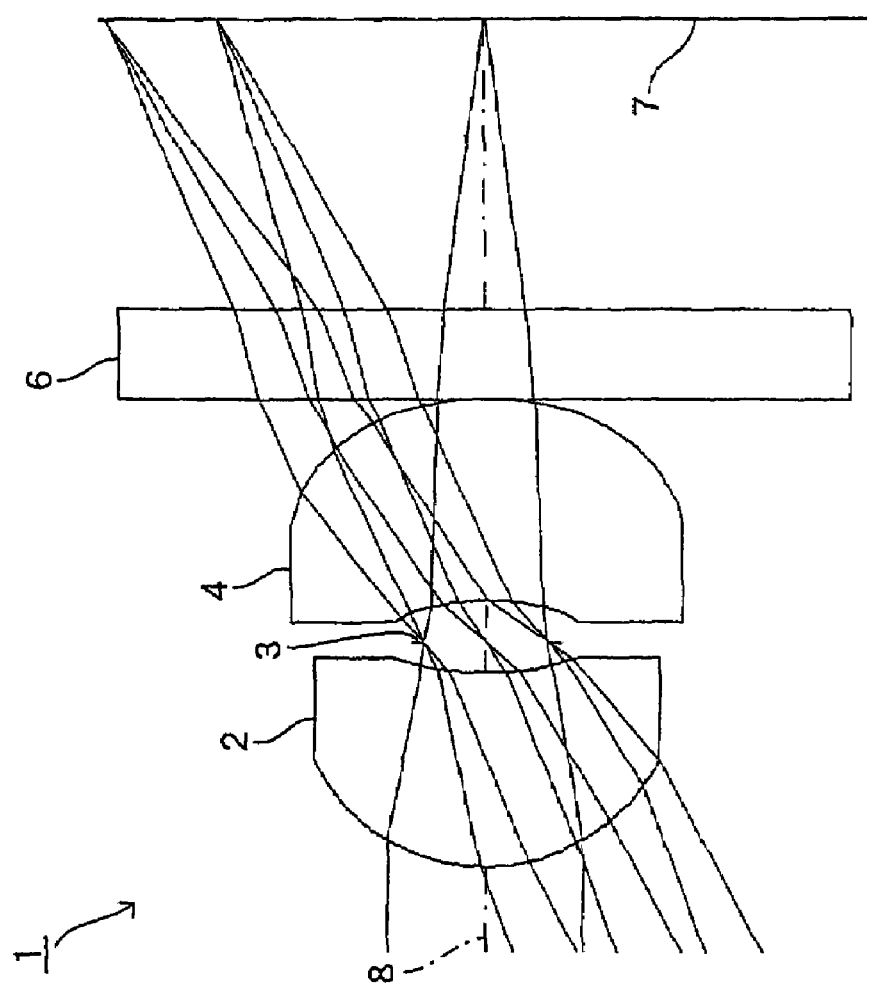
FIG. 14 is a schematic diagram for showing a SEVENTH EXAMPLE of the imaging lens according to the present invention.

FIG. 14 shows a SEVENTH EXAMPLE of the present invention. In the example, as in the FIRST EXAMPLE, a cover glass serving as the filter 6 is disposed between the second face of the second lens 4 and the image-taking surface 7.

The imaging lens 1 of the SEVENTH EXAMPLE was set under the following conditions:

Lens Data
fl = 2.41 mm, $f_1$ = 2.29 mm, $f_2$ = 7.18 mm, F no = 3.5, ω = 57.9°

| Face Number | r | d | nd | vd |
|---|---|---|---|---|
| (Object Point) | | | | |
| 1 (First Face of First Lens) | 0.69 | 0.65 | 1.5310 | 56.0 |
| 2 (Second Face of First Lens) | 1.06 | 0.10 | | |
| 3 (Diaphragm) | 0.00 | 0.14 | | |
| 4 (First Face of Second Lens) | −1.10 | 0.69 | 1.5310 | 56.0 |
| 5 (Second Face of Second Lens) | −1.04 | 0.00 | | |
| 6 (First Face of Cover Glass) | 0.00 | 0.30 | 1.5168 | 64.0 |
| 7 (Second Face of Cover Glass) (Image Surface) | 0.00 | | | |

| Face Number | k | A | B | C | D |
|---|---|---|---|---|---|
| 1 | 0 | −2.40E−2 | 4.16E−1 | −1.56 | 3.12 |
| 2 | 3.90E−1 | 1.59E−1 | −2.78 | 4.81E+1 | −3.23E+2 |
| 4 | 0 | −1.61 | 7.79 | −1.78E+2 | 0 |
| 5 | 1.28 | 7.67E−2 | −1.19 | 3.46 | −4.52 |

Under such conditions, $(r_3+r_4)/(r_3-r_4)=35$ was achieved, thereby satisfying the expression (1). $f_1/fl=0.95$ was achieved, thereby satisfying the expression (2). $f_1/f_2=0.32$ was achieved, thereby satisfying the expression (3). $d_4/r_3=-0.62$ was achieved, thereby satisfying the expression (4). $r_1/r_2=0.65$ was achieved, thereby satisfying the expression (5).

Figure 15:
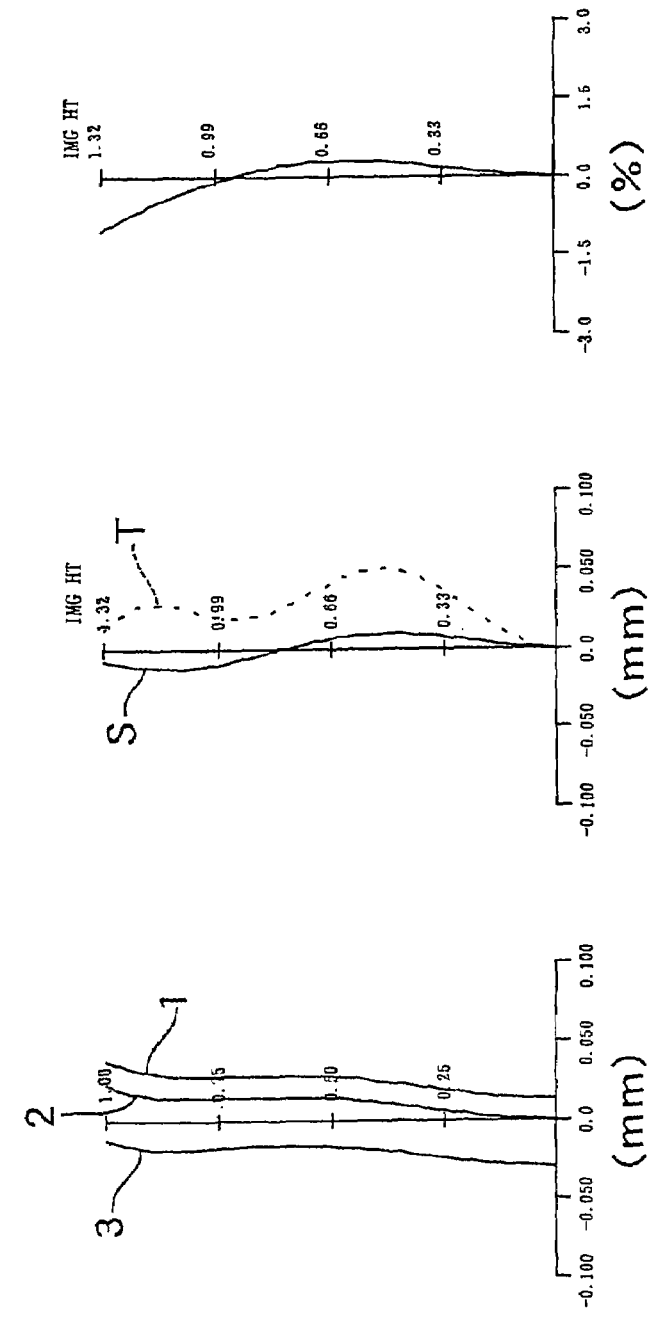
FIG. 15 shows graphs for describing the spherical aberration, astigmatism, and distortion of the imaging lens shown in FIG. 14.

FIG. 15 shows the spherical aberration, the astigmatism and the distortion in the imaging lens 1 of the SEVENTH EXAMPLE.

According to the result, each of the spherical aberration, the astigmatism, and the distortion was almost satisfied. It can be seen from the result that a sufficiently excellent optical property can be obtained.

Eighth Example

Figure 16:
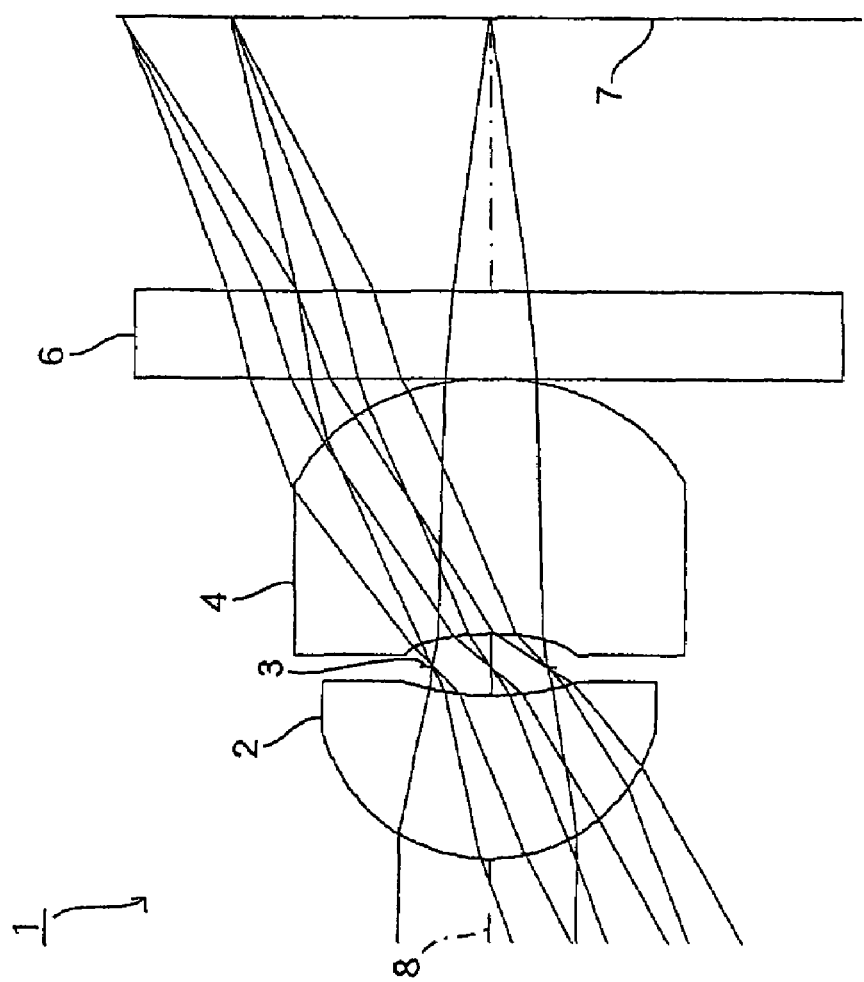
FIG. 16 is a schematic diagram for showing an EIGHTH EXAMPLE of the imaging lens according to the present invention.

FIG. 16 shows a EIGHTH EXAMPLE of the present invention. In the example, as in the FIRST EXAMPLE, a cover glass serving as the filter 6 is disposed between the second face of the second lens 4 and the image-taking surface 7.

The imaging lens 1 of the EIGHTH EXAMPLE was set under the following conditions:

Lens Data
fl = 2.29 mm, $f_1$ = 2.18 mm, $f_2$ = 4.83 mm, F no = 3.5, ω = 60.5°

| Face Number | r | d | nd | vd |
|---|---|---|---|---|
| (Object Point) | | | | |
| 1 (First Face of First Lens) | 0.65 | 0.56 | 1.5310 | 56.0 |
| 2 (Second Face of First Lens) | 1.03 | 0.10 | | |
| 3 (Diaphragm) | 0.00 | 0.12 | | |
| 4 (First Face of Second Lens) | −1.06 | 0.88 | 1.5310 | 56.0 |
| 5 (Second Face of Second Lens) | −0.97 | 0.00 | | |
| 6 (First Face of Cover Glass) | 0.00 | 0.30 | 1.5168 | 64.0 |
| 7 (Second Face of Cover Glass) (Image Surface) | 0.00 | | | |

| Face Number | k | A | B | C | D |
|---|---|---|---|---|---|
| 1 | 0 | −1.70E−2 | 1.11 | −5.15 | 1.31E+1 |
| 2 | 5.77E−2 | 4.87E−2 | 1.49 | 1.22E+1 | −2.95E+2 |
| 4 | 0 | −1.71 | 7.84 | −2.10E+2 | 0 |
| 5 | 6.02E−1 | 1.78E−1 | −1.11 | 2.49 | −2.28 |

Under such conditions, $(r_3+r_4)/(r_3-r_4)=22$ was achieved, thereby satisfying the expression (1). $f_1/fl=0.95$ was achieved, thereby satisfying the expression (2). $f_1/f_2=0.45$ was achieved, thereby satisfying the expression (3). $d_4/r_3=-0.84$ was achieved, thereby satisfying the expression (4). $r_1/r_2=0.63$ was achieved, thereby satisfying the expression (5).

Figure 17:
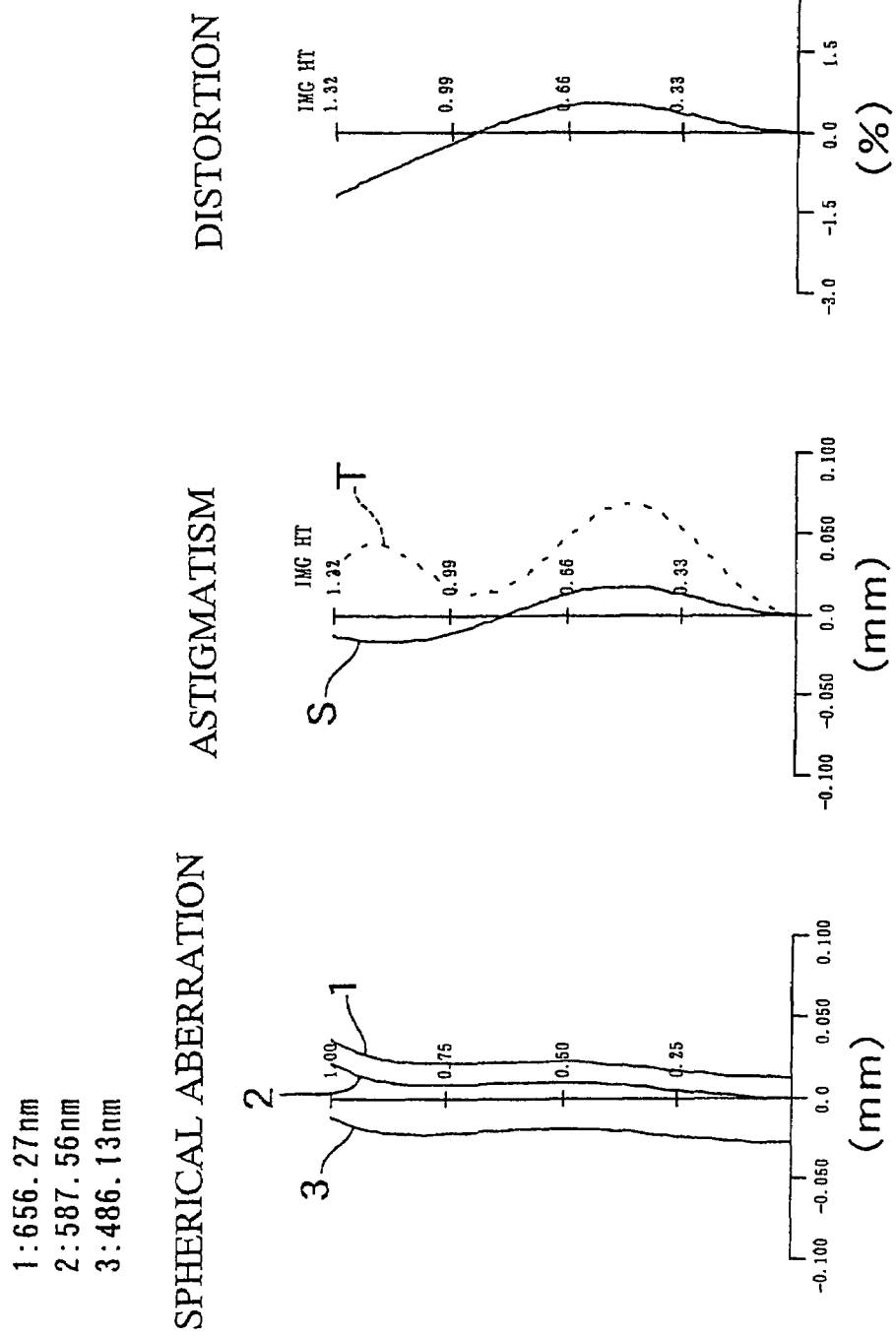
FIG. 17 shows graphs for describing the spherical aberration, astigmatism, and distortion of the imaging lens shown in FIG. 16.

FIG. 17 shows the spherical aberration, the astigmatism and the distortion in the imaging lens 1 of the EIGHTH EXAMPLE.

According to the result, each of the spherical aberration, the astigmatism, and the distortion was almost satisfied. It can be seen from the result that a sufficiently excellent optical property can be obtained.

Ninth Example

Figure 18:
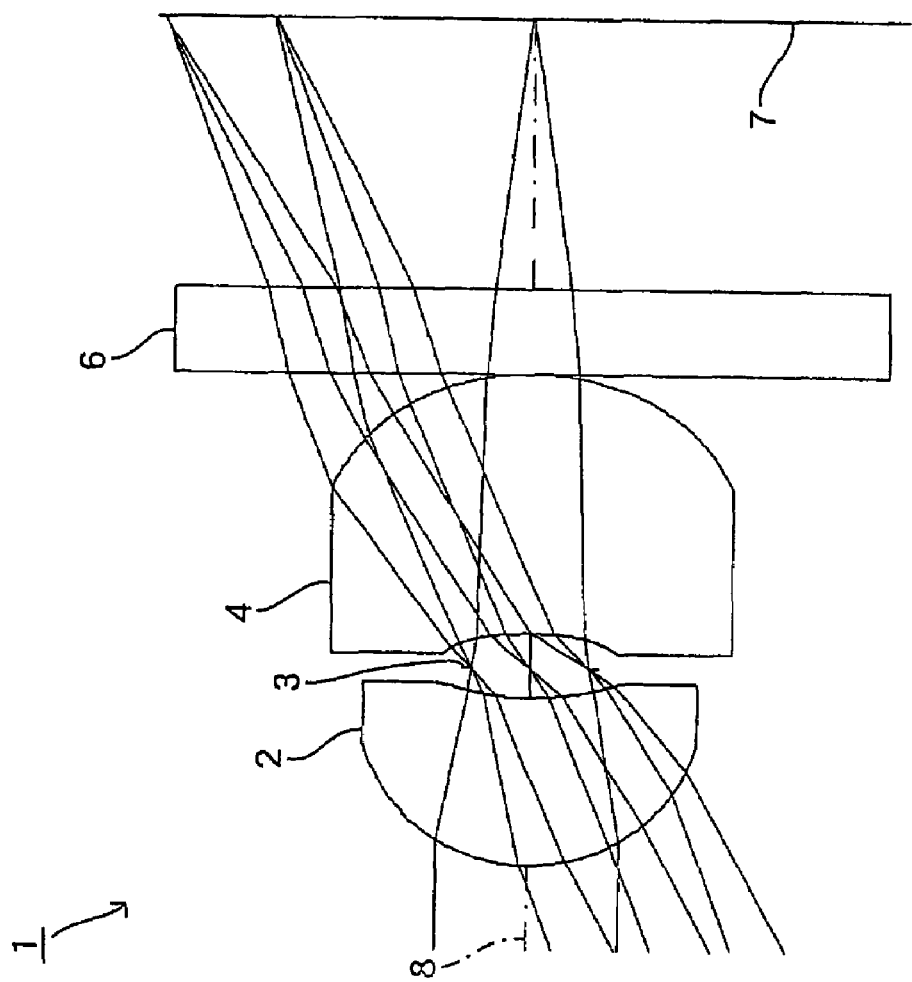
FIG. 18 is a schematic diagram for showing a NINTH EXAMPLE of the imaging lens according to the present invention.

FIG. 18 shows a NINTH EXAMPLE of the present invention. In the example, as in the FIRST EXAMPLE, a cover glass serving as the filter 6 is disposed between the second face of the second lens 4 and the image-taking surface 7.

The imaging lens 1 of the NINTH EXAMPLE was set under the following conditions:

Lens Data
fl = 2.32 mm, $f_1$ = 2.20 mm, $f_2$ = 4.80 mm, F no = 3.5, ω = 60.0°

| Face Number | r | d | nd | νd |
|---|---|---|---|---|
| (Object Point) | | | | |
| 1 (First Face of First Lens) | 0.66 | 0.58 | 1.5310 | 56.0 |
| 2 (Second Face of First Lens) | 1.05 | 0.10 | | |
| 3 (Diaphragm) | 0.00 | 0.13 | | |
| 4 (First Face of Second Lens) | −1.08 | 0.90 | 1.5310 | 56.0 |
| 5 (Second Face of Second Lens) | −0.98 | 0.00 | | |
| 6 (First Face of Cover Glass) | 0.00 | 0.30 | 1.5168 | 64.0 |
| 7 (Second Face of Cover Glass) | 0.00 | | | |
| (Image Surface) | | | | |

| Face Number | k | A | B | C | D |
|---|---|---|---|---|---|
| 1 | 0 | −2.45E−2 | 1.04 | −4.67 | 1.11E+1 |
| 2 | 4.84E−2 | 1.00E−1 | 2.62E−1 | 3.54E+1 | −4.07E+2 |
| 4 | 0 | −1.64 | 7.45 | −1.86E+2 | 0 |
| 5 | 6.00E−1 | 1.47E−1 | −9.11E−1 | 1.94 | −1.73 |

Under such conditions, $(r_3+r_4)/(r_3-r_4)=20$ was achieved, thereby satisfying the expression (1). $f_1/fl=0.95$ was achieved, thereby satisfying the expression (2). $f_1/f_2=0.46$ was achieved, thereby satisfying the expression (3). $d_4/r_3=-0.83$ was achieved, thereby satisfying the expression (4). $r_1/r_2=0.63$ was achieved, thereby satisfying the expression (5).

Figure 19:
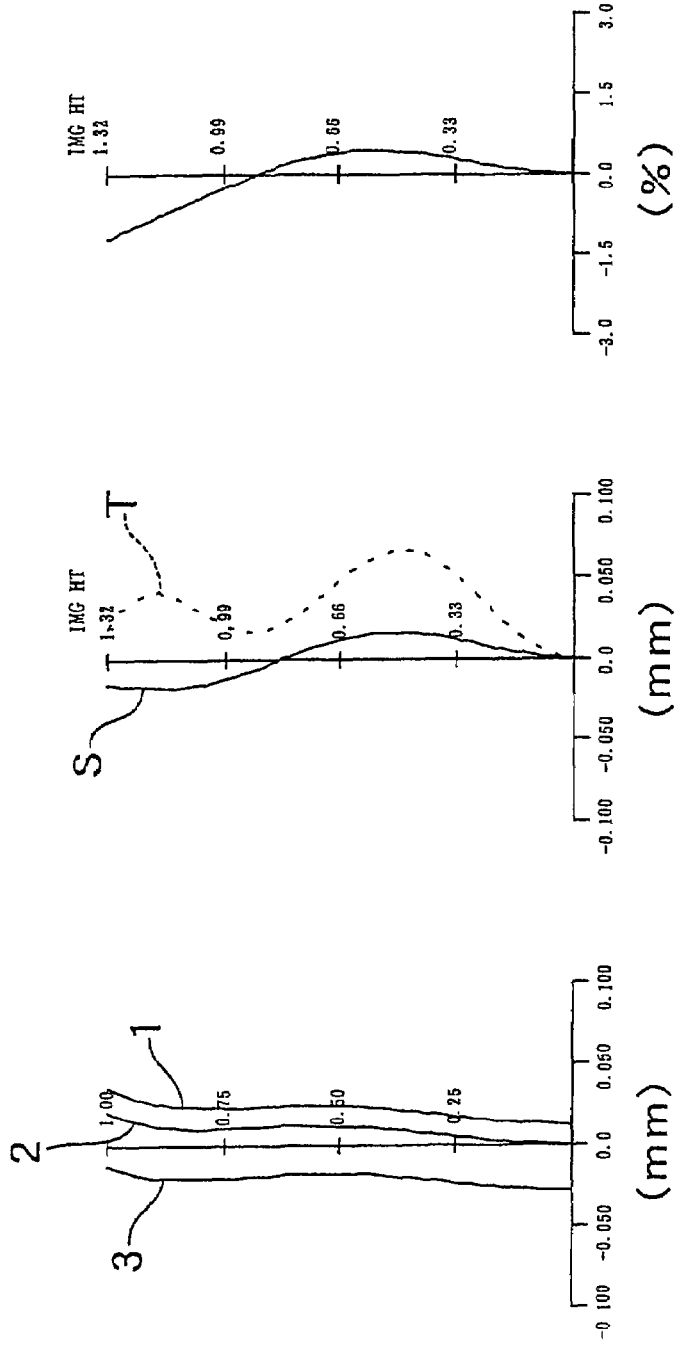
FIG. 19 shows graphs for describing the spherical aberration, astigmatism, and distortion of the imaging lens shown in FIG. 18.

FIG. 19 shows the spherical aberration, the astigmatism and the distortion in the imaging lens 1 of the NINTH EXAMPLE.

According to the result, each of the spherical aberration, the astigmatism, and the distortion was almost satisfied. It can be seen from the result that a sufficiently excellent optical property can be obtained.

Tenth Example

Figure 20:
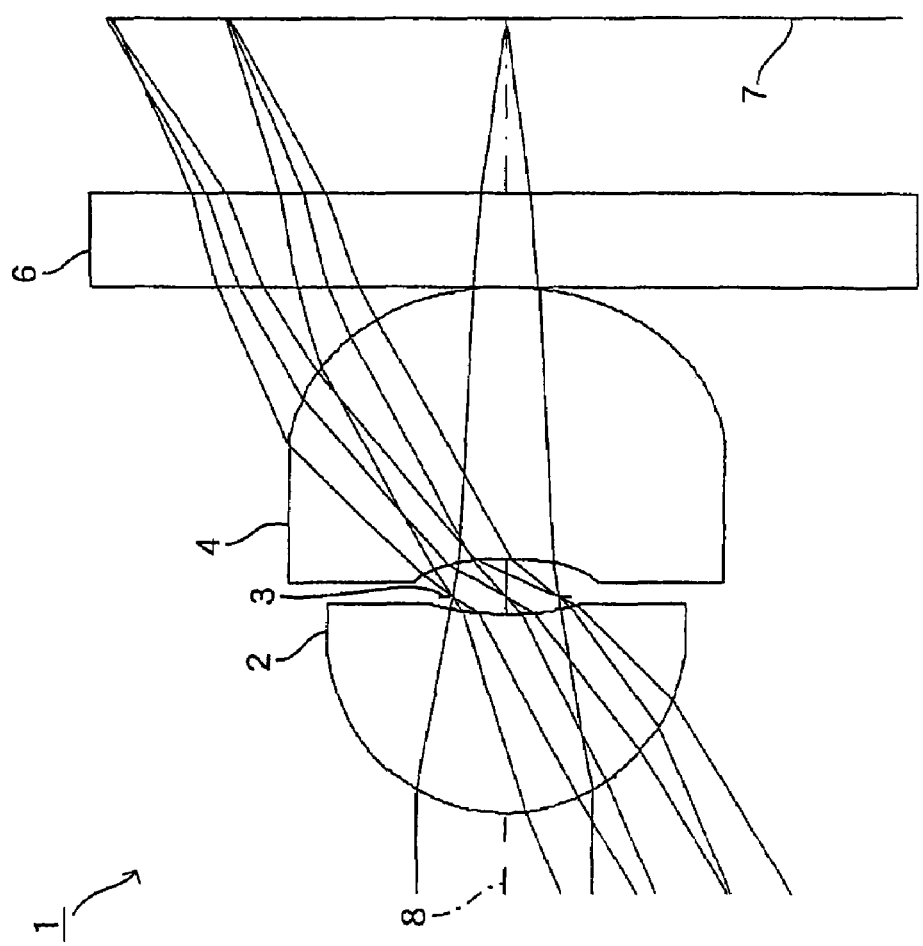
FIG. 20 is a schematic diagram for showing a TENTH EXAMPLE of the imaging lens according to the present invention.

FIG. 20 shows a TENTH EXAMPLE of the present invention. In the example, as in the FIRST EXAMPLE, a cover glass serving as the filter 6 is disposed between the second face of the second lens 4 and the image-taking surface 7.

The imaging lens 1 of the TENTH EXAMPLE was set under the following conditions:

Lens Data
fl = 2.07 mm, $f_1$ = 1.81 mm, $f_2$ = 4.95 mm, F no = 3.5, ω = 64.8°

| Face Number | r | d | nd | νd |
|---|---|---|---|---|
| (Object Point) | | | | |
| 1 (First Face of First Lens) | 0.60 | 0.64 | 1.5310 | 56.0 |
| 2 (Second Face of First Lens) | 1.00 | 0.06 | | |
| 3 (Diaphragm) | 0.00 | 0.12 | | |
| 4 (First Face of Second Lens) | −1.01 | 0.88 | 1.5310 | 56.0 |
| 5 (Second Face of Second Lens) | −0.95 | 0.00 | | |
| 6 (First Face of Cover Glass) | 0.00 | 0.30 | 1.5168 | 64.0 |
| 7 (Second Face of Cover Glass) | 0.00 | | | |
| (Image Surface) | | | | |

| Face Number | k | A | B | C | D |
|---|---|---|---|---|---|
| 1 | 0 | −1.07E−1 | 1.14 | −5.17 | 1.04E+1 |
| 2 | −8.46E−1 | 1.32E−1 | 5.98 | −8.15 | −4.67E+2 |
| 4 | 0 | −2.17 | 1.21E+1 | −3.08E+2 | 0 |
| 5 | 6.70E−1 | 1.93E−1 | −1.75 | 4.32 | −3.95 |

Under such conditions, $(r_3+r_4)/(r_3-r_4)=33$ was achieved, thereby satisfying the expression (1). $f_1/fl=0.87$ was achieved, thereby satisfying the expression (2). $f_1/f_2=0.36$ was achieved, thereby satisfying the expression (3). $d_4/r_3=-0.87$ was achieved, thereby satisfying the expression (4). $r_1/r_2=0.60$ was achieved, thereby satisfying the expression (5).

Figure 21:
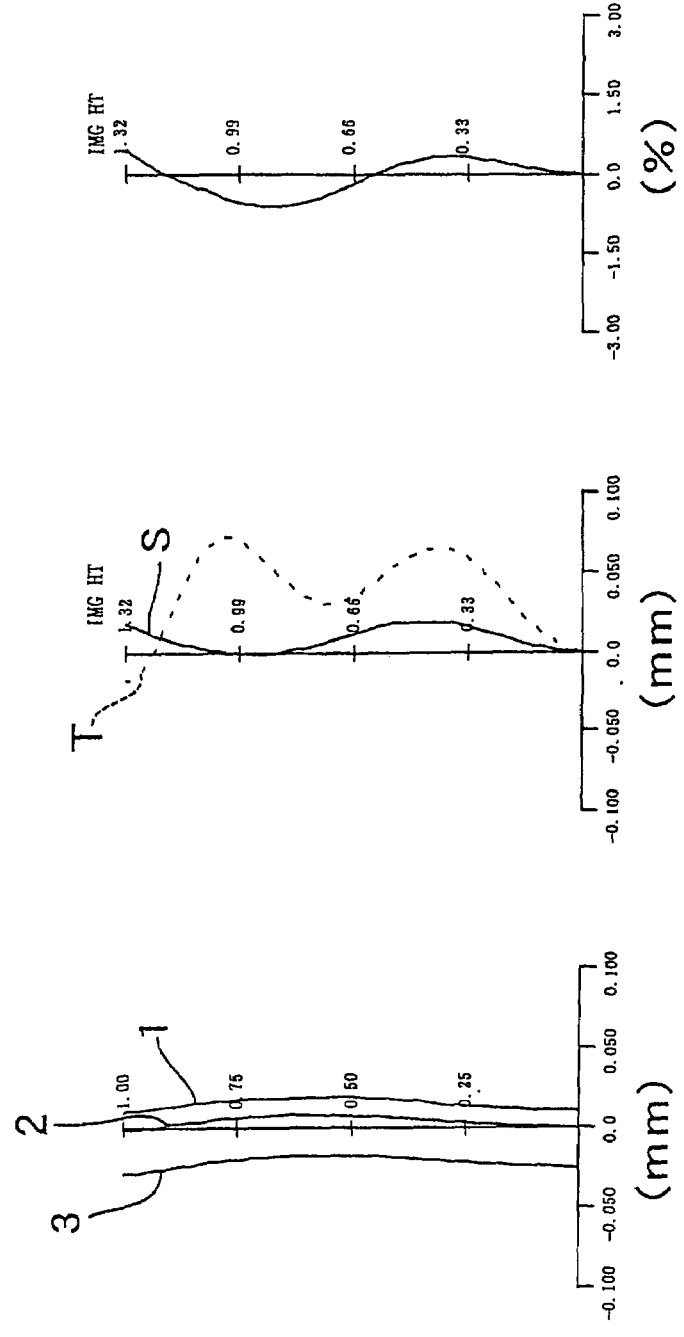
FIG. 21 shows graphs for describing the spherical aberration, astigmatism, and distortion of the imaging lens shown in FIG. 20.

FIG. 21 shows the spherical aberration, the astigmatism and the distortion in the imaging lens 1 of the TENTH EXAMPLE.

According to the result, each of the spherical aberration, the astigmatism, and the distortion was almost satisfied. It can be seen from the result that a sufficiently excellent optical property can be obtained.

Eleventh Example

Figure 22:
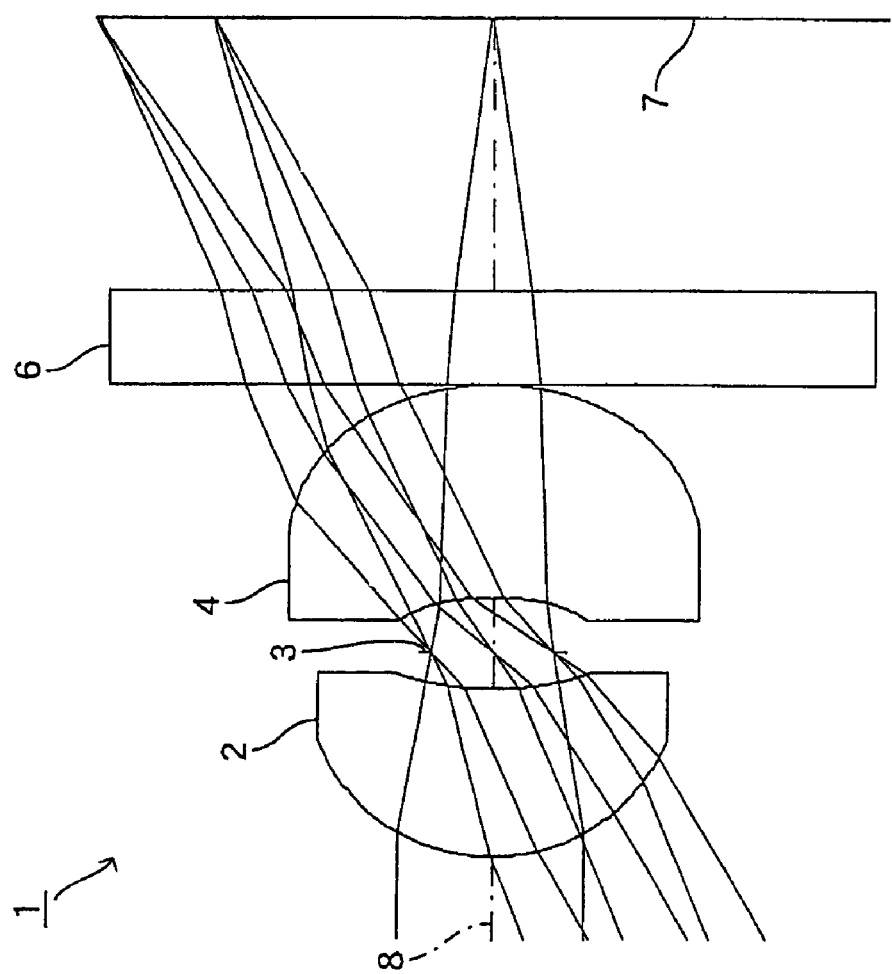
FIG. 22 is a schematic diagram for showing a ELEVENTH EXAMPLE of the imaging lens according to the present invention.

FIG. 22 shows an ELEVENTH EXAMPLE of the present invention. In the example, as in the FIRST EXAMPLE, a cover glass serving as the filter 6 is disposed between the second face of the second lens 4 and the image-taking surface 7.

The imaging lens 1 of the ELEVENTH EXAMPLE was set under the following conditions:

Lens Data
fl = 2.2 mm, $f_1$ = 2.10 mm, $f_2$ = 5.54 mm, F no = 3.5, ω = 61.3°

| Face Number | r | d | nd | νd |
|---|---|---|---|---|
| (Object Point) | | | | |
| 1 (First Face of First Lens) | 0.65 | 0.54 | 1.5310 | 56.0 |
| 2 (Second Face of First Lens) | 1.09 | 0.12 | | |
| 3 (Diaphragm) | 0.00 | 0.18 | | |
| 4 (First Face of Second Lens) | −1.00 | 0.69 | 1.5310 | 56.0 |
| 5 (Second Face of Second Lens) | −0.92 | 0.00 | | |
| 6 (First Face of Cover Glass) | 0.00 | 0.30 | 1.5168 | 64.0 |
| 7 (Second Face of Cover Glass) | 0.00 | | | |
| (Image Surface) | | | | |

| Face Number | k | A | B | C | D |
|---|---|---|---|---|---|
| 1 | 0 | −8.26E−2 | 1.14 | −5.07 | 1.10E+1 |
| 2 | −1.83 | 3.33E−2 | 4.38 | 4.83 | −1.87E+2 |
| 4 | 0 | −2.00 | 1.32E+1 | −2.16E+2 | 0 |
| 5 | 8.29E−1 | 1.54E−1 | −1.51 | 4.55 | −5.60 |

Under such conditions, $(r_3+r_4)/(r_3-r_4)=26$ was achieved, thereby satisfying the expression (1). $f_1/fl=0.96$ was achieved, thereby satisfying the expression (2). $f_1/f_2=0.38$ was achieved, thereby satisfying the expression (3). $d_4/r_3=-0.69$ was achieved, thereby satisfying the expression (4). $r_1/r_2=0.59$ was achieved, thereby satisfying the expression (5).

FIG. 23 shows the spherical aberration, the astigmatism and the distortion in the imaging lens 1 of the ELEVENTH EXAMPLE.

According to the result, each of the spherical aberration, the astigmatism, and the distortion was almost satisfied. It can be seen from the result that a sufficiently excellent optical property can be obtained.

The present invention is not limited to the above-described embodiment. Various modifications can be made as required.

For example, a light-transmitting material other than resin material can be suitably used as the material for the first lens and the second lens.

What is claimed is:

1. An imaging lens used for forming an image of an object on an image-taking surface of an image sensor element, comprising:

in order from an object side to an image surface side, a first lens that is a meniscus lens having a positive power whose convex surface faces the object side, a diaphragm, a second lens that is a meniscus lens having a positive power whose convex surface faces the image surface side, wherein conditions expressed by the following expressions (1) and (2) are to be satisfied:

$$22 \leq (r_3 + r_4)/(r_3 - r_4) \leq 35 \qquad (1)$$

$$0.5 \leq f_1/fl \leq 1 \qquad (2)$$

where, $r_3$: center radius curvature of the object side face of the second lens $r_4$: center radius curvature of the image surface side face of the second lens $f_1$: focal distance of the first lens fl: focal distance of the entire lens system.

2. An imaging lens according to claim 1, wherein:
a condition expressed by a following expression (3) is to be further satisfied:

$$0.2 f_1/f_2 \leq 0.5 \qquad (3)$$

where, $f_2$: focal distance of the second lens.

3. An imaging lens according to claim 1, wherein:
a condition expressed by a following expression (4) is to be further satisfied:

$$-1 \leq d_4/r_3 \leq -0.5 \qquad (4)$$

where, $d_4$: center thickness of the second lens.

4. An imaging lens according to claim 1, wherein:
a condition expressed by a following expression (5) is to be further satisfied:

$$0.4 \leq r_1/r_2 \leq 1 \qquad (5)$$

where, $r_1$: center radius curvature of the object side face of the first lens $r_2$: center radius curvature of the image surface side face of the first lens.

5. An imaging device comprising the imaging lens according to any one of claims 1 to 4 and an image sensor element.

* * * * *